(12) United States Patent
Kouduki et al.

(10) Patent No.: US 7,520,183 B2
(45) Date of Patent: Apr. 21, 2009

(54) HUB UNIT WITH SENSOR

(75) Inventors: Kenichi Kouduki, Kashiwara (JP);
Katsura Koyagi, Kashiwara (JP);
Masahiro Inoue, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 140 days.

(21) Appl. No.: 10/569,725

(22) PCT Filed: Aug. 30, 2004

(86) PCT No.: PCT/JP2004/012877

§ 371 (c)(1),
(2), (4) Date: Sep. 27, 2006

(87) PCT Pub. No.: WO2005/022104

PCT Pub. Date: Mar. 10, 2005

(65) Prior Publication Data
US 2007/0157742 A1    Jul. 12, 2007

(30) Foreign Application Priority Data

Aug. 29, 2003 (JP) .............................. 2003-306053
Aug. 29, 2003 (JP) .............................. 2003-306350
Aug. 29, 2003 (JP) .............................. 2003-307597
Sep. 4, 2003 (JP) .............................. 2003-312074

(51) Int. Cl.
*G01L 3/14* (2006.01)
(52) U.S. Cl. ................................. 73/862.322
(58) Field of Classification Search ............. 73/862.322
See application file for complete search history.

(56) References Cited

U.S. PATENT DOCUMENTS 5,026,178 A * 6/1991 Ballhaus ............... 384/448
5,488,871 A * 2/1996 Harbottle et al. .......... 73/862.55
5,597,965 A * 1/1997 Endo et al. ................ 73/862.49
5,975,761 A * 11/1999 Ouchi et al. ............... 384/448
6,003,375 A * 12/1999 Ouchi et al. ............. 73/514.39
6,471,407 B1  10/2002 Katano
6,658,943 B2 * 12/2003 McDearmon ............. 73/795
6,802,208 B2 * 10/2004 Chinitz et al. ............. 73/118.1
2002/0157470 A1  10/2002 Noetzel et al.

FOREIGN PATENT DOCUMENTS

| EP | 0 432 122 A2 | 6/1991 |
| EP | 1 079 125 A2 | 2/2001 |
| EP | 1 550 813 A1 | 7/2005 |
| EP | 1 591 765 A1 | 11/2005 |
| JP | 11-183275 | 7/1999 |
| JP | 2003-207402 | 7/2003 |
| JP | 2004-142577 | 5/2004 |
| JP | 2004-264050 | 9/2004 |

* cited by examiner

*Primary Examiner*—Harshad Patel
*Assistant Examiner*—Octavia Davis
(74) *Attorney, Agent, or Firm*—Oblon, Spivak, McClelland, Maier & Neustadt, P.C.

(57) ABSTRACT

A hub unit with a sensor comprises a hub unit 1 including a body-side raceway member 3, a wheel-side raceway member 4 and two rows of rolling elements 5, and a sensor device 2. The sensor device 2 includes a magnetostrictive sensor 8 for detecting the inverse magnetostrictive effect, and the magnetostrictive sensor 8 is mounted to the body-side raceway member 3 so as to be capable of measuring the tensile strain in the uppermost part of an inner wheel 17 of the wheel-side raceway member 4. From the output of the magnetostrictive sensor 8, the tire grounding load and the rotational velocity are detected.

23 Claims, 14 Drawing Sheets

RADIAL LOAD

AXIAL LOAD

RADIAL LOAD

AXIAL LOAD

HUB UNIT WITH SENSOR

TECHNICAL FIELD

The present invention relates to a hub unit with a sensor in which a hub unit constituting an automobile and a sensor device for detecting various kinds of information of the automobile are formed integrally.

BACKGROUND ART

In an automobile, various kinds of information for performing the control thereof are required; therefore, it has been proposed to provide a sensor device to a hub unit including a body-side raceway member to be fixed to the vehicle body side, a wheel-side raceway member to which a wheel is to be mounted, and two rows of rolling elements disposed between the both members. For example, Patent Document 1 (Japanese Unexamined Patent Publication No. 3-209016) discloses a hub unit with a sensor in which an annular support member is mounted on an inner end face of a body-side raceway member, and a strain sensor is mounted to the annular support member.

In recent years, control means of an automobile include, in addition to an ABS (Antilock Braking System) control, a driving force control for not causing drive wheels to spin when starting or accelerating, and a braking force control for suppressing skidding when cornering. In order to control the automobile more accurately, it is important to detect data which can be used effectively for these controls. In view of the above circumstance, the present inventors set an object to improve the control of vehicles by accurately measuring grounding loads placed on tires (wheels).

However, since the hub unit with a sensor of Patent Document 1 is adapted to measure the strain of the annular support member, there was a problem that when the tire grounding load was obtained from the strain, an error became large, so that the tire grounding load could not be obtained with high accuracy from the measurement values of the strain sensor. In view of this problem, the present inventors proposed to obtain the tire grounding load with high accuracy by using magnetostrictive sensors (Patent Document 2=Japanese Patent Application No. 2002-142417).

According to the hub unit with a sensor of Patent Document 2, if a location to which a magnetostrictive sensor is mounted is appropriate, expected effects are obtained, but if a location to which a magnetostrictive sensor is mounted is inappropriate, the inverse magnetostrictive effect to be detected is smaller. As a result, there has been a case that an error in the tire grounding load to be obtained is large. Further, although it is desired to extract only left-and-right directional components among tire grounding loads as data preferable for vehicle control, there has been a problem that if a location to which the magnetostrictive sensor is mounted is inappropriate, the left-and-right directional tire grounding load cannot be obtained with high accuracy.

An object of the present invention is to provide a hub unit with sensors capable of making mounting positions of the sensors appropriate when mounting sensors (including not only magnetostrictive sensors but also displacement sensors) by specifying a location where the inverse magnetostrictive effect or the displacement amount becomes larger in the hub unit to thereby enable to determine tire grounding loads with high accuracy by using the sensors, and capable of determining by extracting not only an up-and-down directional tire grounding load, but only a left-and-right directional tire grounding load, or determining by extracting an up-and-down directional tire grounding load and a left-and-right directional tire grounding load, respectively.

DISCLOSURE OF THE INVENTION

A hub unit with a sensor (hub unit with a magnetostrictive sensor) according to a first aspect of the present invention comprises: a hub unit which includes a body-side raceway member to be fixed to a vehicle body side, a wheel-side raceway member, having an inner shaft with a flange for mounting a wheel and an inner ring fitted to the inner shaft, to which a wheel is to be mounted, and two rows of rolling elements disposed between the both raceway members; and a sensor device. The sensor device includes at least one magnetostrictive sensor for detecting the inverse magnetostrictive effect, and a processing means for processing the output of the magnetostrictive sensor. The at least one magnetostrictive sensor is mounted to the body-side raceway member so as to be capable of measuring either tensile strain in the uppermost part of the inner ring or compression strain in the lowermost part of the body-side raceway member. The processing means includes a tire grounding load computing unit for obtaining a tire grounding load and a rotation detecting unit for obtaining a wheel rotational velocity.

A magnetostrictive sensor is a sensor for measuring the inverse magnetostrictive effect (a phenomenon that a magnetic force appears when a substance strains or is deformed). Examples of the magnetostrictive sensor include: an magnetic impedance sensor (MI sensor) for measuring the external magnetic field by utilizing the electromagnetic phenomenon in which when high frequency current is applied to a magnetic line with high magnetic permeability, the impedance between the both ends of the magnetic line varies depending on the external magnetic field; and a stress impedance sensor (SI sensor) utilizing a fact that the impedance changes depending on the stress.

The grounding load applied to each tire varies depending on the velocity variation and the posture alteration of the traveling vehicle. At this time, the force placed by the rolling elements on the wheel-side raceway member and the body-side raceway member varies depending on the tire grounding load. The variations of this force appears as the strain variation amount of the wheel-side raceway member and the body-side raceway member near the rolling elements. Therefore, by detecting the strain variation amount by the magnetostrictive sensor and calculating inversely, it is possible to obtain the variation amount of the tire grounding load. Further, as the rolling elements revolve, the stress is repeated in a frequency corresponding to the number of rolling elements and the rotational velocity. Therefore, by using the number of repetitions, it is possible to obtain rotational information (rotational velocity, total number of rotations, etc.) of the hub unit.

In the hub unit with the magnetostrictive sensor, it is preferable that the tire grounding load computing unit includes a left-and-right directional tire grounding load computing unit for obtaining a left-and-right directional tire grounding load. More preferably, the sensor device includes at least three magnetostrictive sensors for detecting the inverse magnetostrictive effect. The at least three magnetostrictive sensors include at least one magnetostrictive sensor for detecting a left-and-right directional tire grounding load mounted to the body-side raceway member so as to be capable of measuring either the tensile strain in the uppermost part of the inner ring or the compression strain in the lowermost part of the body-side raceway member, and at least two magnetostrictive sensors for detecting a front-and-back directional tire grounding load mounted opposite to each other at the front and the back of the body-side raceway member so as to be capable of measuring either the tensile strain in the intermediate part between the uppermost part and the lowermost part of the inner ring or the compression strain in the intermediate part between the uppermost part and the lowermost part of the body-side raceway member. The left-and-right directional tire grounding load is detected from the output of the magnetostrictive sensor for detecting the left-and-right directional tire grounding load, and the front-and-back directional tire grounding load is detected from the output of the magnetostrictive sensor for detecting the front-and-back directional tire grounding load.

When the grounding load is acted on a tire, compression strain or tensile strain is caused in each part of the hub unit. Generally, the plumb line running through the center between two rows of rolling elements of a hub unit is located outside in the axial direction from the plumb line running through the center of the tire. In the hub unit including a wheel-side raceway member consisting of an inner shaft and an inner ring, relatively large strain is caused in an inner ring near the vehicle body side. This strain in the inner ring becomes the maximum strain in a tensile direction in the uppermost part opposite to the grounding center. Accordingly, by disposing a magnetostrictive sensor so as to detect the tensile strain of the inner ring, it is possible to detect a larger inverse magnetostrictive effect. Further, the output of the magnetostrictive sensor obtained by detecting the strain in the tensile direction has an extremely high correlation with the left-and-right directional tire grounding load. Therefore, by calculating the relational equation between the sensor output and the left-and-right directional tire grounding load beforehand, it is possible to obtain the left-and-right directional tire grounding load from the strain in a tensile direction of the inner ring. Further, when the load acted on the tire is in a front-and-back direction, the strain of the inner ring becomes the maximum in the intermediate part between the uppermost part and the lowermost part. When the vehicle is decelerated, the strain becomes strain in a tensile direction at a position of the front side in the traveling direction, and when the vehicle is accelerated, the strain becomes strain in a tensile direction at a position of the back side in the traveling direction. Therefore, by disposing the magnetostrictive sensors just outside the inner ring shoulder part so as to be opposite to each other in the front and back such that the tensile strain is detected in the intermediate part between the uppermost part and the lowermost part, a large inverse magnetostrictive effect corresponding to the front and back load is detected when decelerated and accelerated. The output of the magnetostrictive sensors obtained by detecting the inverse magnetostrictive effect has an extremely high correlation with the front-and-back directional tire grounding load. Therefore, by calculating the relational equation between the sensor output and the front-and-back directional tire grounding load beforehand, the front-and-back directional tire grounding load can also be obtained from the tensile strain of the inner ring. In this way, it is possible to obtain by extracting not only the up-and-down directional tire grounding load, but only the left-and-right directional tire grounding load, or to obtain by extracting the left-and-right directional tire grounding load and the front-and-back directional tire grounding load, respectively.

Similarly, in the body-side raceway member of the hub unit, relatively large strain is caused near the plumb line running through the center between the rolling elements. The strain of the body-side raceway member becomes the maximum strain in a compression direction in the lowermost part which is a side near the grounding center. Therefore, by disposing the magnetostrictive sensor so as to detect compression strain of the body-side raceway member, it is possible to detect a larger inverse magnetostrictive effect. Further, the output of the magnetostrictive sensor obtained by detecting the strain in the compression direction has an extremely large correlation with the left-and-right directional tire grounding load. Therefore, by calculating the relational equation between the sensor output and the left-and-right directional tire grounding load beforehand, it is possible to obtain the left-and-right directional tire grounding load from the strain in a compression direction of the body-side raceway member. Further, when the load acted on the tire is in a front-and-back direction, the strain of the body-side raceway member becomes the maximum in the intermediate part between the uppermost part and the lowermost part. When the vehicle is decelerated, the strain becomes strain in a compression direction at a position of the back side in the traveling direction, and when the vehicle is accelerated, the strain becomes strain in a compression direction at a position of the front side in the traveling direction. Therefore, by disposing the magnetostrictive sensors just outside the body-side raceway member so as to be opposite to each other in the front and the back such that the compression strain is detected in the intermediate part between the uppermost part and the lowermost part, a large inverse magnetostrictive effect corresponding to the front and back load is detected when decelerated and accelerated. The output of the magnetostrictive sensors obtained by detecting the inverse magnetostrictive effect has an extremely high correlation with the front-and-back directional tire grounding load. Therefore, by calculating the relational equation between the sensor output and the front-and-back directional tire grounding load beforehand, the front-and-back directional tire grounding load can also be obtained from the strain in a compression direction of the body-side raceway member. In this way, it is possible to obtain by extracting not only the up-and-down directional tire grounding load, but only the left-and-right directional tire grounding load, or to obtain by extracting the left-and-right directional tire grounding load and the front-and-back directional tire grounding load, respectively.

Further, in the hub unit with the magnetostrictive sensor, the magnetostrictive sensor is disposed at only one location on the periphery of the body-side raceway member. The disposing position may be a position spaced apart at a predetermined angle from the uppermost part or the lowermost part.

The strain caused in the uppermost part or the lowermost part of the hub unit is due to the left-and-right directional tire grounding load (influence of front-and-back directional tire grounding load is almost zero), and in the intermediate part between the uppermost part and the lowermost part of the hub unit (position spaced apart at 90° from the uppermost part or the lowermost part), the strain is caused due to the front-and-back directional tire grounding load (influence of the left-and-right directional tire grounding load is almost zero). Further, strain caused at a position spaced apart at a predetermined angle from the uppermost part or the lowermost part of the hub unit is due to both the left-and-right directional tire grounding load and the front-and-back directional tire grounding load, which is detected by the magnetostrictive sensor. Here, a "predetermined angle" is set to almost 45° for example, but it may be appropriately set in a range of about 30 to 60°. In short, it is determined appropriately in a range where the influence of both the left-and-right directional tire grounding load and the front-and-back directional tire grounding load appears.

In the hub unit with only one magnetostrictive sensor, a sensor is mounted to each of the four hub units located at four locations, that is, front, back, left and right of the vehicle.

When the magnetostrictive sensor is disposed at a position spaced apart at a predetermined angle from the uppermost part or the lowermost part, all components of the up-and-down direction, left-and-right direction and front-and-back direction of the tire grounding load are included in the output of the sensor. For example, when the vehicle turns left, the outputs of the sensors of the hub units on the right side (both front and back) increase. If the vehicle is decelerated in this state, the output of the sensor of the hub unit on the front right side further increases. Therefore, the synthesized grounding load applied to each tire is obtained from the output of each sensor. Further, from the difference between the total output of the front and back sensors of the left wheel side and the total output of the front and back sensors of the right wheel side, the amount of load shift at the time of turning is obtained, and from the difference between the total output of the left and right sensors on the front wheel side and the total output of the left and right sensors on the rear wheel side, the amount of load shift at the time of braking is obtained, respectively. Thereby, a vehicle control using the tire grounding load can be performed. When controlling the vehicle including hub units each of which has only one magnetostrictive sensor, it is possible to perform a control with high accuracy based on the tire grounding load by combining the outputs of the magnetostrictive sensors with the steering angle, the accelerator pressing amount, brake pressing amount, and the like.

In the hub unit with only one magnetostrictive sensor, a hub unit with a sensor having a magnetostrictive sensor for measuring the tensile strain of the inner ring is disposed on each of the four locations, that is, front, back, left and right of the vehicle. In the hub units of the front wheel side, the magnetostrictive sensors may be positioned near the front in the traveling direction, and in the hub units of the rear wheel side, the magnetostrictive sensors may be positioned near the back in the traveling direction. Further, a hub unit with a sensor having a magnetostrictive sensor for measuring the compression strain of the body-side raceway member is disposed at each of the four locations, that is, front, back, left and right of the vehicle. In the hub units of the front wheel side, the magnetostrictive sensors may be positioned near the front in the traveling direction, and in the hub units of the rear wheel side, the magnetostrictive sensors may be positioned near the back in the traveling direction, respectively. In the magnetostrictive sensor, since the output characteristics differ depending on whether the strain is tensile strain or compression strain, if all magnetostrictive sensors are disposed near the front in the traveling direction for example, the front-and-back directional tire grounding load is detected appropriately only when the vehicle is decelerated for those measuring the tensile strain of the inner ring, and only when the vehicle being accelerated for those measuring the compression strain of the body-side raceway member. However, by disposing the magnetostrictive sensors near the front in the traveling direction on the front wheel side and disposing the magnetostrictive sensors near the back in the traveling direction on the rear wheel side, measurement of the front-and-back directional load when decelerated becomes possible on either the front wheel side or the rear wheel side, and measurement of the front-and-back directional tire grounding load when accelerated becomes possible on the other side, whereby it is possible to obtain the front-and-back directional tire grounding load irrespective of acceleration or deceleration.

The magnetostrictive sensor may be made to face a shoulder part end face of the inner ring so as to be capable of measuring the tensile strain in the axial direction of the inner ring. Further, the magnetostrictive sensor may be made to face a shoulder part end face of the inner ring so as to be capable of measuring the tensile strain in the radial direction of the inner ring. In either case, it is possible to measure the inverse magnetostrictive effect with respect to a direction of the tensile strain from the same direction thereof, whereby the maximum sensitivity of the magnetostrictive sensor can be measured. Further, it is preferable that a magnetostrictive sensor for measuring the compression strain of the body-side raceway member is made to face the body-side raceway member from the outside in the radial direction. By measuring the inverse magnetostrictive effect from the radial direction, that is, from a direction orthogonal to the compression strain with respect to a direction of compression strain (axial direction), measurement at the maximum sensitivity of the magnetostrictive sensor becomes possible.

It is more preferable that the hub unit with a sensor according to the first aspect of the present invention is used in combination with a displacement sensor if a tire grounding point is offset with respect to the center between the rolling members of the hub unit for example. In this case, the displacement sensor is provided so as to measure the displacement in the uppermost part of the inner ring. Then, whether the left-and-right directional tire grounding load exists or not is detected by utilizing a fact that positive and negative of the displacement amount of the displacement sensor reverses, and the left-and-right directional tire grounding load is separated from the up-and-down directional tire grounding load and detected by the magnetostrictive sensor for detecting the left-and-right directional tire grounding load for detecting the tensile strain in the uppermost part of the inner ring.

A hub unit with a sensor according to a second aspect of the present invention (hub unit with a displacement sensor) comprises: a hub unit which includes a body-side raceway member to be fixed to a vehicle body side, a wheel-side raceway member, having an inner shaft with a flange for mounting a wheel and an inner ring fitted to the inner shaft, to which a wheel is to be mounted, and two rows of rolling elements disposed between the both raceway members; and a sensor device. The sensor device includes at least one displacement sensor, and a processing means for processing output of the displacement sensor. The at least one displacement sensor is mounted to the body-side raceway member so as to be capable of measuring displacement in the uppermost part or in the lowermost part of either the inner ring or the body-side raceway member. The processing means includes a tire grounding load calculating unit for obtaining a tire grounding load, and a rotation detecting unit for obtaining a wheel rotational velocity.

A displacement sensor may be one using an eddy current system, a laser system, an optical system utilizing PSD, an ultrasonic system, a magnetic system, or a magnetostrictive system. Further, it may not be of a non-contact system but of a contact system.

The grounding load placed on each tire varies according to the velocity variation or the posture alteration of the traveling vehicle. At this time, displacements of the wheel-side raceway member (particularly, the inner ring) and the body-side raceway member vary corresponding to the tire grounding load. By detecting the variation of the displacements with the displacement sensor and calculating inversely, the variation amount of the tire grounding load can be obtained.

Preferably, in the hub unit with a displacement sensor as described above, the sensor device includes at least two displacement sensors. The at least two sensors include: at least one displacement sensor for detecting the left-and-right directional tire grounding load mounted to the body-side raceway member so as to be capable of measuring displacement in the uppermost part or the lowermost part of either the inner ring or the body-side raceway member; and at least one displacement sensor for detecting the front-and-back directional tire grounding lord mounted to the body-side raceway member so as to be capable of measuring either displacement in the intermediate part between the uppermost part and the lowermost part of the inner ring or displacement in the intermediate part between the uppermost part and the lowermost part of the body-side raceway member. The left-and-right directional tire grounding load is detected from output of the displacement sensor for detecting the left-and-right directional tire grounding load, and the front-and-back directional tire grounding load is detected from output of the displacement sensor for detecting the front-and-back directional tire grounding load.

When a grounding load is acted on a tire, compression or tensile strain is caused in each part of the hub unit. Generally, the plumb line running through the center of the two rows of rolling elements of the hub unit is located outside in the axial direction from the plumb line running through the center of the tire. In a hub unit having a wheel-side raceway member consisting of an inner shaft and an inner ring, relatively large strain (displacement) is caused in the inner ring near the vehicle body side. The displacement of the inner ring becomes the maximum in the uppermost part which is the opposite side of the grounding center and in the lowermost part on the grounding center side. Therefore, by disposing the displacement sensor so as to detect the displacement in the uppermost part or the lowermost part of the inner ring, larger displacement can be detected. Further, the output of the displacement sensor obtained by detecting each displacement of the inner ring has an extremely high correlation with the left-and-right directional tire grounding load. Therefore, by calculating the relational equation between the sensor output and the left-and-right directional tire grounding load beforehand, it is possible to obtain the left-and-right directional tire grounding load from the displacement of the inner ring. Further, if the load acted on a tire is in a front-and-back direction, the displacement of the inner ring becomes the maximum in the intermediate part between the uppermost part and the lowermost part. Then, when decelerated, the displacement increases at a position of the front side in the traveling direction, and when accelerated, the displacement increases at a position of the back side in the traveling direction. Therefore, by disposing the magnetostrictive sensors just outside the inner ring shoulder part so as to be opposite to each other in the front and the back such that the displacement variation amount is detected in the intermediate part between the uppermost part and the lowermost part, large displacement corresponding to the front and back load can be detected when decelerated and accelerated. The output of the displacement sensor obtained by detecting the displacement has an extremely high correlation with the front-and-back directional tire grounding load. Therefore, by calculating the relational equation between the sensor output and the front-and-back tire grounding load beforehand, the front-and-back directional tire grounding load can also be obtained from the displacement of the inner ring. In this way, it is possible to obtain by extracting not only the up-and-down directional tire grounding load, but only the left-and-right directional tire grounding load, or by extracting the left-and-right directional tire grounding load and the front-and-back directional tire grounding load, respectively.

Similarly, in the body-side raceway member of the hub unit, relatively large strain is caused near the plumb line running through the center between the rolling elements. The strain of the body-side raceway member becomes the maximum strain in a compression direction in the lowermost part which is the side near the grounding center, and becomes the maximum strain in a tensile direction in the uppermost part which is the side far from the grounding center. Therefore, by disposing the displacement sensor so as to detect the displacement in the radial direction near the part between the rolling elements of the body-side raceway member, larger displacement can be detected. Further, in the flange of the body-side raceway member, the displacement in the axial direction becomes the maximum in the lowermost part and the uppermost part. Therefore, by disposing the displacement sensor so as to detect the displacement in the axial direction of the flange in the lowermost part and the uppermost part of the body-side raceway member, larger displacement can be detected. Further, the output of the displacement sensor obtained by detecting each displacement of the body-side raceway member has an extremely high correlation with the left-and-right directional tire grounding load. Therefore, by calculating the relational equation between the sensor output and the left-and-right directional tire grounding load beforehand, it is possible to obtain the left-and-right directional tire grounding load from the displacement. Moreover, when the load acted on the tire is in a front-and-back direction, the displacement of the body-side raceway member becomes the maximum in the intermediate part between the uppermost part and the lowermost part. When the vehicle is decelerated, the displacement increases at a position on the back side in the traveling direction, and when the vehicle is accelerated, the displacement increases at a position on the front side in the traveling direction. Therefore, by disposing the magnetostrictive sensor just outside the body-side raceway member or inside in the axial direction of the flange so as to detect the displacement variation amount in the intermediate part between the uppermost part and the lowermost part, a large displacement corresponding to the front and back load is detected when decelerated and accelerated. The output of the displacement sensor obtained by detecting the displacement has an extremely high correlation with the front-and-back directional tire grounding load. Therefore, by calculating the relational equation between the sensor output and the front-and-back directional tire grounding load beforehand, the front-and-back directional tire grounding load can be obtained from the displacement of the body-side raceway member. In this way, it is possible to obtain by extracting not only the up-and-down directional tire grounding load, but only the left-and-right directional tire grounding load, or extracting the left-and-right directional tire grounding load and the front-and-back directional tire grounding load, respectively.

In the hub unit with the displacement sensor, the displacement sensor may be disposed at only one location on the periphery of the body-side raceway member, and the disposing location is set to be a position spaced apart at a predetermined angle from the uppermost part or the lowermost part.

The displacement caused in the uppermost part and the lowermost part of the hub unit is due to the left-and-right directional tire grounding load (influence of the front-and-back directional tire grounding load is almost zero), and in the intermediate part between the uppermost part and the lowermost part of the hub unit (a position spaced apart at 90° from the uppermost part or the lowermost part), it is due to the front-and-back directional tire grounding load (influence of the left-and-right directional tire grounding load is almost zero). The displacement caused at a position spaced apart at a predetermined angle from the uppermost part or the lowermost part of the hub unit is due to both the left-and-right directional tire grounding load and the front-and-back directional tire grounding load, which is detected by the displacement sensor. Here, a "predetermined angle" is set to, for example, almost 45°. However, it may be set appropriately within a range of about 30 to 60°. In short, it is determined appropriately within a range where influence of both the left-and-right directional tire grounding load and the front-and-back directional tire grounding load appears.

The sensor is mounted to each hub unit disposed at each of the four locations, that is, front, back, left and right of the vehicle. If the displacement sensor is disposed at a position spaced apart at a predetermined angle from the uppermost part or the lowermost part, all components of an up-and-down direction, left-and-right direction and front-and-back direction of the tire grounding load are included in the output of the displacement sensor. For example, when the vehicle turns left, outputs of the sensors of the hub units on the right side (both front and back) increase, and if the vehicle is decelerated in this state, output of the sensor of the hub unit on the front right side increases. Therefore, the synthesized grounding load placed on each tire is obtained from the output of each sensor. Further, from the difference between the total output of the front and back sensors on the left wheel side and the total output of the front and back sensors of the right wheel side, the amount of load shift at the time of turning is obtained, and from the difference between the total output of the left and right sensors on the front wheel side and the total output of the left and right sensors on the rear wheel side, the amount of load shift at the time of braking is obtained, respectively. Thereby, a vehicle control using the tire grounding load is possible.

In the hub unit with the displacement sensor, the displacement sensor may be made to face a shoulder part end face of the inner ring so as to be capable of measuring a displacement in the radial direction of the inner ring. Further, the displacement sensor may be made to face the body-side raceway member from the outside in the radial direction, or may be made to face the flange of the body-side raceway member from the inside in the axial direction. In any case, the displacement sensor can detect large displacement.

Further, when a tire grounding point is offset with respect to the center between the rolling members of the hub unit, it is possible to enable to detect whether the left-and-right directional tire grounding load exists or not by utilizing a fact that positive and negative of the displacement amount of the displacement sensor provided to the uppermost part of the inner ring reverses.

According to the hub unit with the magnetostrictive sensor of the present invention, since the magnetostrictive sensor detects the inverse magnetostrictive effect along with the tensile strain in the uppermost part of the inner ring near the rolling elements or the compression strain in the lowermost part of the body-side raceway member, measurement is performed at a location where the inverse magnetostrictive effect is large. Therefore, the tire grounding load can be detected with high accuracy. The tire grounding load obtained in this way is used as substitute data of the slip ratio in an ABS control, and also used in a drive force control, a brake force control and the like, which contributes to an improvement in accuracy of the vehicle control. Further, in either case of detecting the tensile strain of the inner ring or the compression strain of the body side raceway member, the output of the magnetostrictive sensor has an extremely high correlation with the left-and-right directional tire grounding load. Therefore, the left-and-right directional tire grounding load can be obtained from the strain in a compression direction. Further, by disposing the magnetostrictive sensor also in the intermediate part between the uppermost part and the lowermost part respectively, the front-and-back directional tire grounding load can also be obtained. The left-and-right directional tire grounding load and/or the front-and-back directional tire grounding load extracted independently becomes important data for controlling at the time of vehicle turning, enabling a control before the wheels cause a slip.

Further, according to the hub unit with the displacement sensor of the present invention, since the displacement sensor detects displacement of a part where the displace amount is the maximum of the inner ring or the body-side raceway member, measurement is performed at a location where the displacement is large. Therefore, the tire grounding load can be detected with high accuracy. The tire grounding load obtained in this way is used as substitute data of the slip ratio in an ABS control, and also used in a drive force control, a brake force control and the like, which contributes to an improvement in accuracy of the vehicle control. Further, in either case of detecting the displacement of the inner ring or the body-side raceway member, the output of the displacement sensor has an extremely high correlation with the left-and-right directional tire grounding load. Therefore, the left-and-right directional tire grounding load can be obtained from the displacement. Further, by disposing the displacement sensor also in the intermediate part between the uppermost part and the lowermost part respectively, the front-and-back directional tire grounding load can also be obtained. The left-and-right directional tire grounding load and/or the front-and-back directional tire grounding load extracted independently becomes important data for controlling at the time of vehicle turning, enabling a control before the wheels cause a slip.

BEST MODE FOR CARRYING OUT THE INVENTION

Embodiments of the present invention will be explained below with reference to the drawings.

Figure 1:
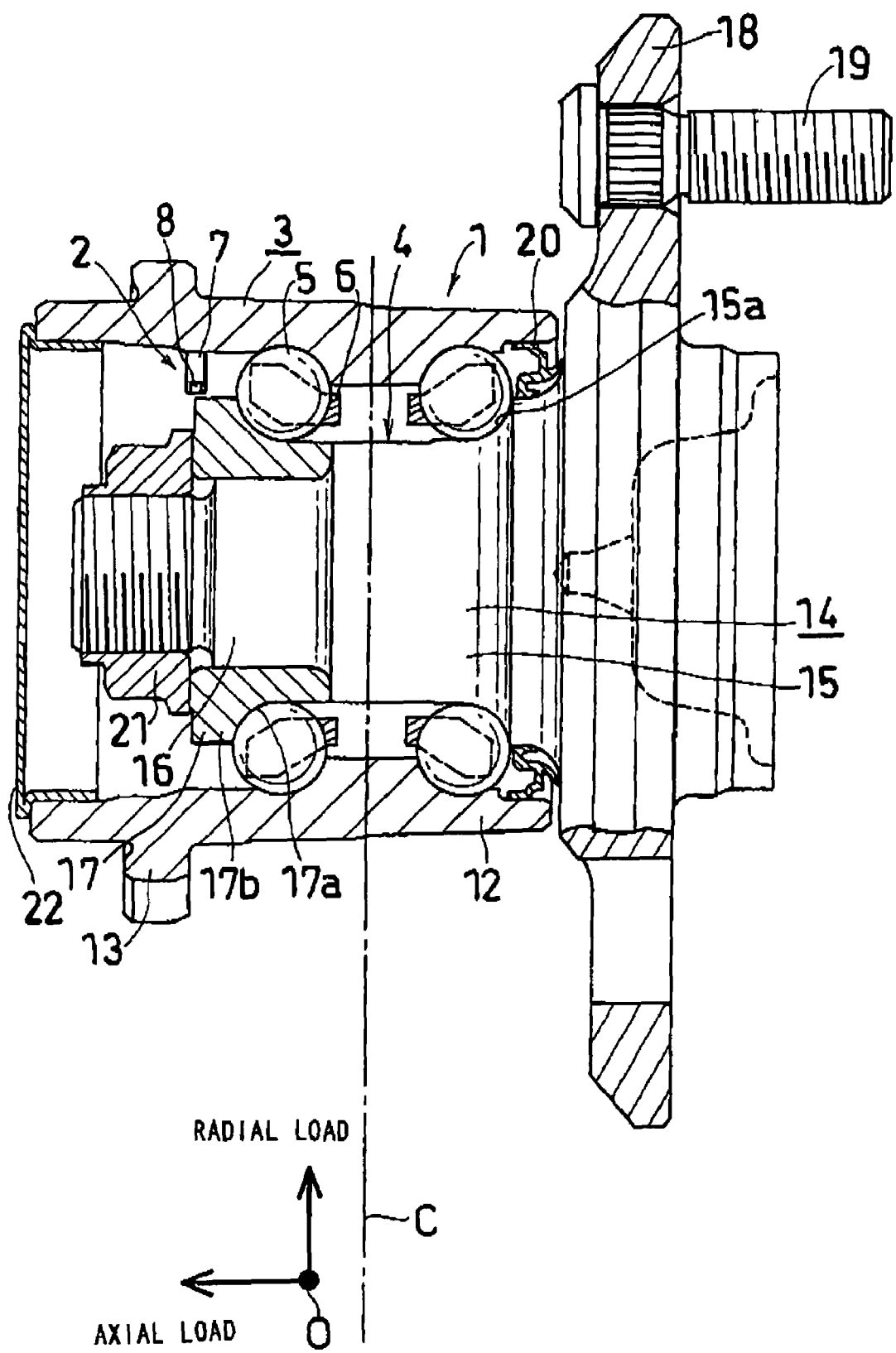
FIG. 1 is a vertical sectional view showing a first embodiment of a hub unit with a sensor according to a first aspect of the present invention.

FIG. 1 shows a first embodiment of a hub unit with a sensor of a first aspect of the present invention. In the following explanation, left and right will be referred to as the left and right of FIG. 1. Note that the left is the inside of the vehicle, and the right is the outside of the vehicle.

The hub unit with a sensor comprises a hub unit (1) and a sensor device (2) for detecting the rotation thereof and the tire grounding load.

The hub unit (1) includes a body-side raceway member (3) which is to be fixed to the vehicle body side, a wheel-side raceway member (4) to which a wheel is to be mounted, a plurality of balls (5) which are rolling elements disposed in two rows between the both members (3) and (4), and cages (6) for holding the balls (5) of the respective rows.

The body-side raceway member (3) has an outer ring (fixed ring) function of a bearing, including a cylindrical part (12) in which two rows of outer ring raceways are formed on the inner peripheral face, and a flange part (13) provided near the left end part of the cylindrical part (12) and is mounted with bolts to a suspension device (vehicle body).

The wheel-side raceway member (4) consists of an inner shaft (14) having a large diameter part (15) with a first raceway groove (15a) and a small diameter part (16) with an outer diameter smaller than the first raceway groove (15a), and an inner ring (17) in which the right face fitted to the outer diameter of the small diameter part (16) of the inner shaft (14) closely contacts the left face of the large diameter part (15) of the inner shaft (14). Near the right end of the inner shaft (14), there is provided a flange part 18 to which a plurality of bolts (19) for mounting a wheel are fixed. On the right part of the inner ring (17), a raceway groove (17a) is formed so as to be in parallel with the raceway groove (15a) of the inner shaft (14), and a shoulder part (17b) is formed on the left part of the inner ring (17). A seal device (20) is provided between the right end part of the body-side raceway member (3) and the inner shaft (14). The left end part of the small diameter part (16) of the inner shaft (14) is provided with a male screw part, and with a nut (21) engaged with the male screw part, the inner ring (17) is fixed to the inner shaft (14). On the left end part of the body-side raceway member (3), a cover (22) is applied and fixed.

The sensor device (2) includes a support member (7) mounted to the body-side raceway member (3), a magnetostrictive sensor (8) mounted to the support member (7), and a processing means (not shown in FIG. 1, see FIG. 7) for processing the output of the magnetostrictive sensor (8). The magnetostrictive sensor (8) is a magnetic impedance sensor, and the sensing surface thereof is made to face the left end face of the uppermost part of the inner ring (17) from the outside in the radial direction so as to measure the tensile strain on the left end face of the uppermost part of the inner ring (17) of the wheel-side raceway member (4).

When grounding loads (radial load and axial load) are acted on a tire, compression or tensile strain is caused in each part of the hub unit (1) In general, a plumb line (C) running through the center between the two rows of balls (5) of the hub unit (1) is located outside in the axial direction from a plumb line running through the center (0) of the tire. In the hub unit (1) having the wheel-side raceway member (4) consisting of the inner shaft (14) and the inner ring (17), relatively large strain is caused in the inner ring (17) near the body-side. The strain of the inner ring (17) becomes the maximum strain in a tensile direction in the uppermost part opposite to the grounding center. The magnetostrictive sensor (8) shows the maximum sensitivity with respect to the compression strain when it is made to face from a direction orthogonal thereto, and shows the maximum sensitivity with respect to the tensile strain when it is made to face from the same direction thereof. Accordingly, as shown in FIG. 1, by disposing the magnetostrictive sensor (8) just outside the uppermost part of the inner ring shoulder part (17b) so as to detect the tensile strain of the left end face of the inner ring (17), a large inverse magnetostrictive effect is detected.

Figure 5:
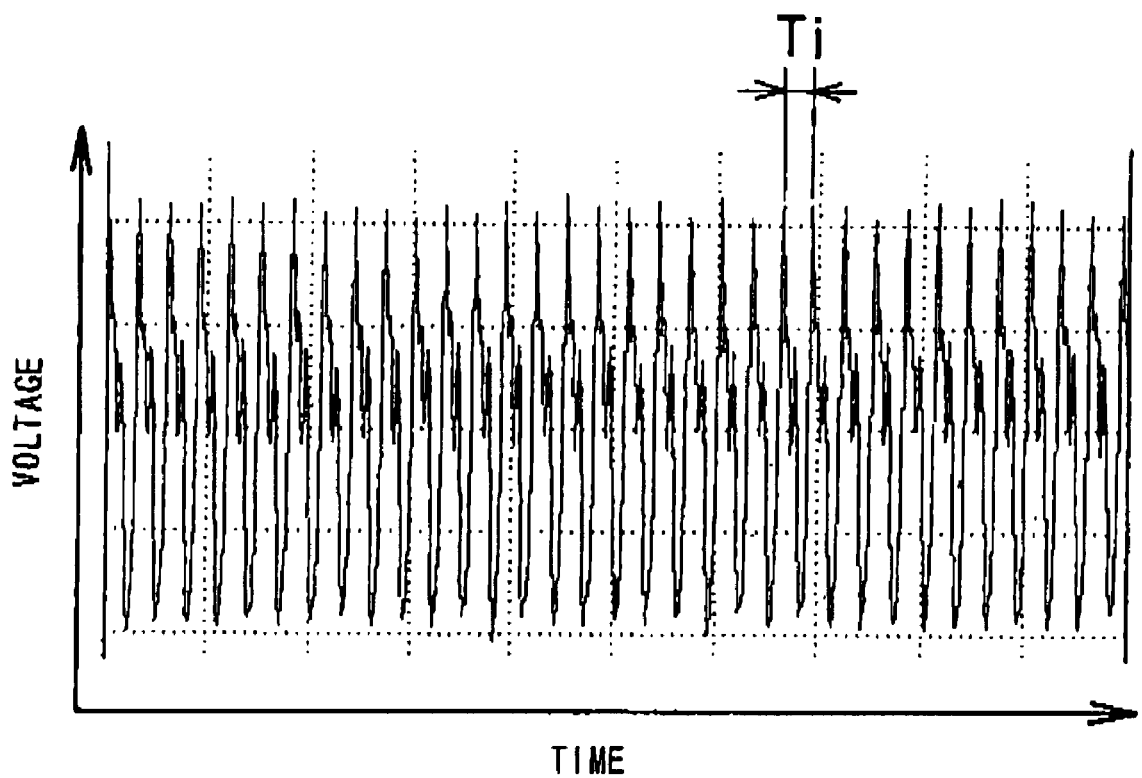
FIG. 5 is a chart showing an exemplary output of a magnetostrictive sensor.
Figure 6:
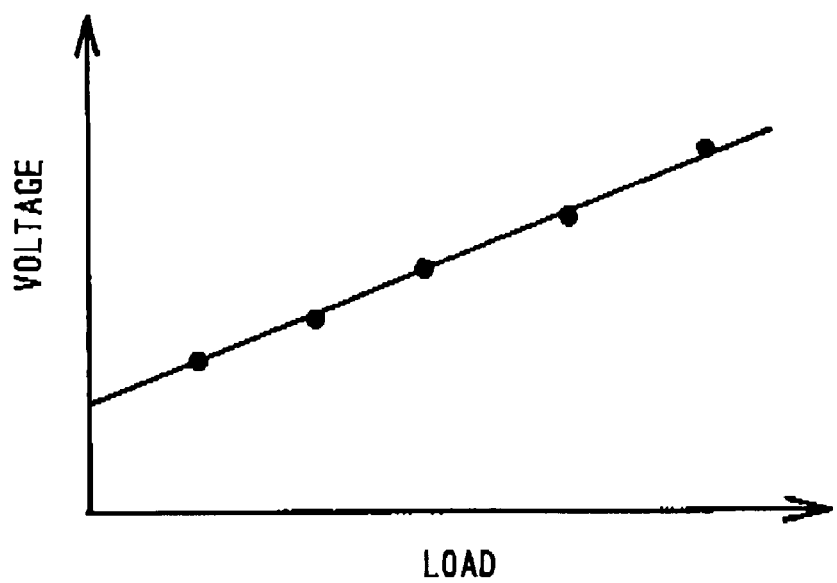
FIG. 6 is a graph showing the relationship between the output of a magnetostrictive sensor and the lord.

When the grounding load of the tire varies, the force applied to the balls (5) varies. The ball nearby part of the shoulder part (17b) of the inner ring (17) produces an inverse magnetostrictive effect according to variations of the strain caused by the force applied by the balls (5). The output voltage of the magnetostrictive sensor (8) according to the inverse magnetostrictive effect changes periodically as shown in FIG. 5. Further, the relationship between the averaged voltage of the magnetostrictive sensor (8) and the grounding load is in a linear relationship as shown in FIG. 6.

Here, between the number of revolutions Nb of the balls (5) and the number of rotations Ni of the wheel-side raceway member (4), there is a relationship of Nb≈Ni/2 as the contact angle is small, so that a time required for a rotation of one turn of the wheel-side raceway member (4) is obtained by multiplying a cycle (Ti) of the strain by the number of balls (5) and further doubling it. Therefore, the number of rotations of the wheel-side raceway member (4) can be obtained from the number of repetitions of strain variations. Note that the relationship between the number of revolutions Nb of the rolling elements and the number of rotations Ni of the inner ring where the contact angle is α is, assuming D is the pitch diameter of the rolling elements and d is the diameter of the rolling elements, Nb=(1−d cos α/D)Ni/2.

Figure 7:
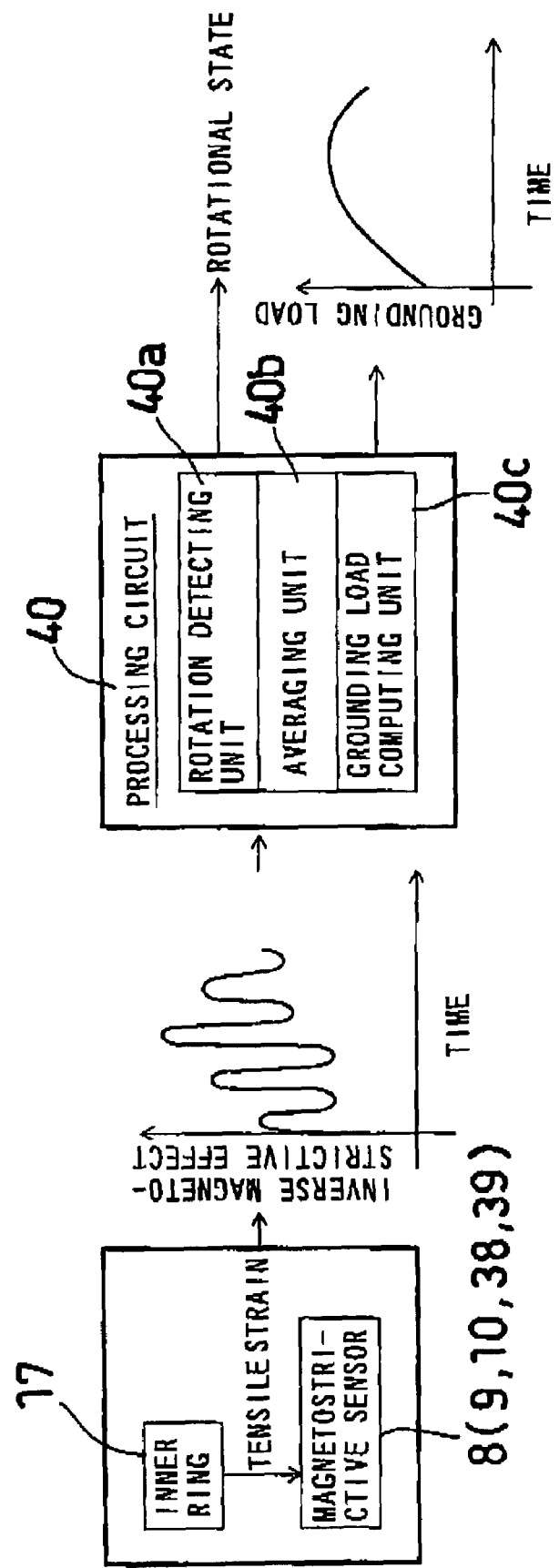
FIG. 7 is a block diagram showing a sensor device of the hub unit with a sensor according to the first aspect of the present invention.

Accordingly, as shown in FIG. 7, in a rotation detecting unit (40a) of the processing means (40), the number of rotations of the wheel-side raceway member (14) can be obtained from the number of repetitions of gap variations. On the other hand, the amplitude of the inverse magnetostrictive effect of the shoulder part (17b) of the inner wheel (17) is averaged in an averaging unit (40b) of the processing means (40). Since the relationship between the averaged voltage of the magnetostrictive sensor (8) and the grounding load is in a linear relationship, it is possible to obtain the grounding load from the voltage average value of the magnetostrictive sensor (8) in a grounding load computing unit (40c) of the processing means (40) by storing the linear equation on the memory beforehand. The amount of variation of the grounding load thus obtained is outputted to a vehicle control means, whereby a control appropriate for the vehicle is performed.

Figure 9:
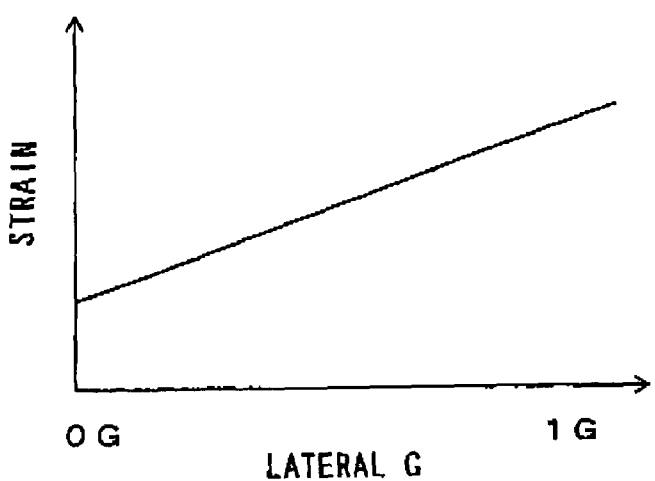
FIG. 9 is a graph showing the relationship between the output of a magnetostrictive sensor and the lateral G in each embodiment of the first aspect of the present invention.

FIG. 9 shows a result of examining the relationship between the output of the magnetostrictive sensor obtained by detecting the strain in the tensile direction described above and the left-and-right directional tire grounding load. As shown in the same figure, the strain (magnetostrictive sensor output voltage changing amount) and the lateral G (left-and-right directional tire grounding load) are in a linear relationship. Therefore, by calculating the relational equation between the sensor output and the left-and-right directional tire grounding load (a and b in y=ax+b) beforehand, it is possible to obtain the left-and-right directional tire grounding load from the tensile strain in the radial direction of the inner ring (17).

Figure 2:
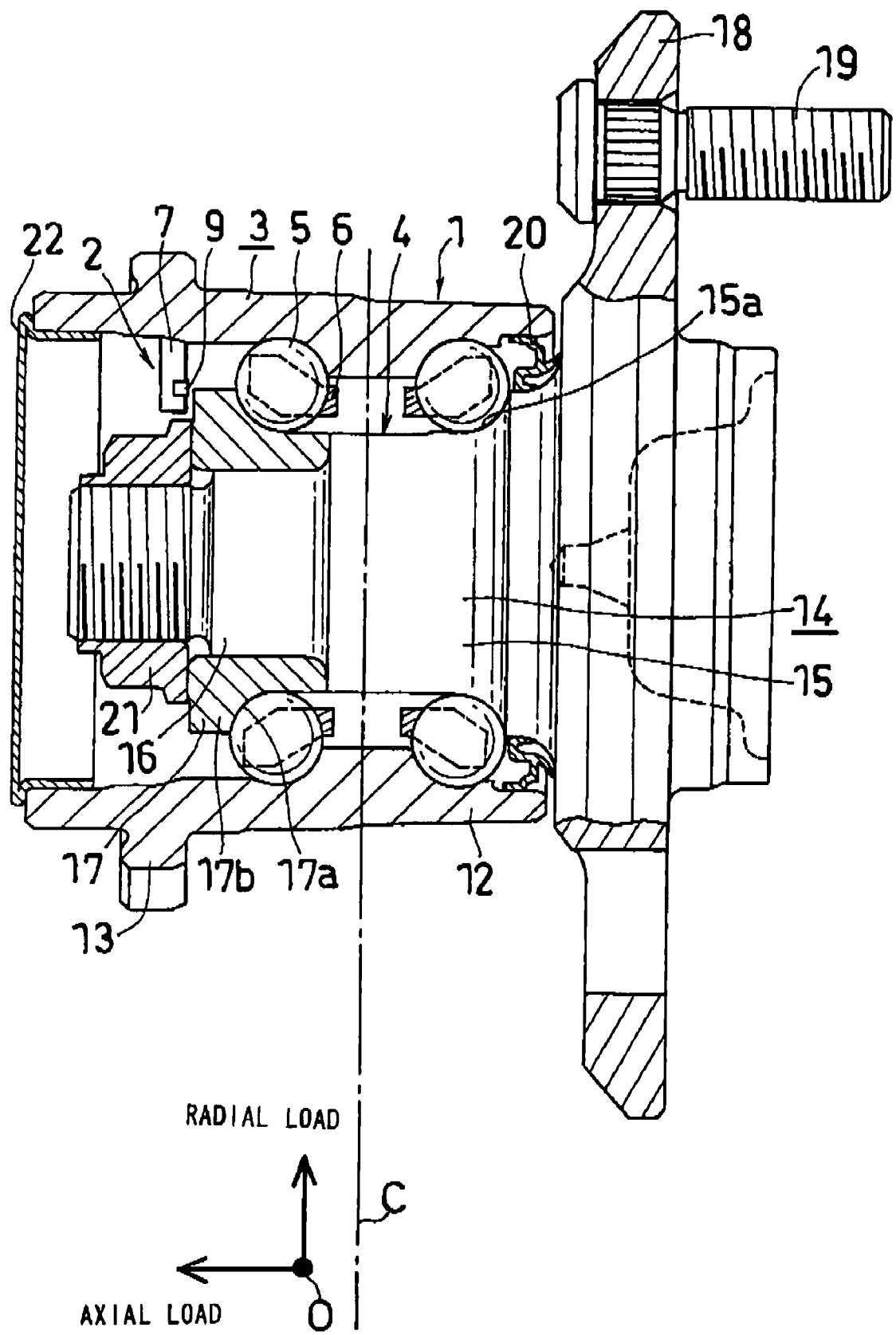
FIG. 2 is a vertical sectional view showing a second embodiment of the hub unit with a sensor according to the first aspect of the present invention.

FIG. 2 shows a second embodiment of a hub unit with a sensor of the first aspect of the present invention. The hub unit with a sensor of the second embodiment is different in the configuration of the sensor device from that of the first embodiment. In the explanation below, the same configuration will be denoted by the same reference numeral, and the explanation is omitted.

The sensor device (2) of the hub unit with the sensor of the second embodiment includes a support member (7) mounted to the body-side raceway member (3), a magnetostrictive sensor (9) mounted to the support member (7), and a processing means (not shown in FIG. 2, see FIG. 7) for processing output of the magnetostrictive sensor (9). The magnetostrictive sensor (9) is a magnetic impedance sensor, and the sensing surface thereof is made to face the left end face of the uppermost part of the inner ring shoulder part (17b) of the wheel-side raceway member (4) from the left side in the axial direction so as to measure the tensile strain on the outer peripheral face of the uppermost part of the inner ring (17) of the wheel-side raceway member (4). In this way, by disposing the magnetostrictive sensor (9) on just left side of the uppermost part of the inner ring shoulder part (17b) so as to detect the tensile strain in the axial direction of the inner ring (17), a large inverse magnetostrictive effect is detected.

Accordingly, as shown in FIG. 7, in the rotational detecting unit (40a) of the processing means (40), the number of rotations of the wheel-side raceway member (14) can be obtained from the number of repetitions of gap variations. On the other hand, the amplitude of the inverse magnetostrictive effect of the shoulder part (17b) of the inner ring (17) is averaged in the averaging unit (40b) of the processing means (40). Since the relationship between the averaged voltage of the magnetostrictive sensor (9) and the grounding load is in a linear relationship, it is possible to obtain the grounding load from the voltage average value of the magnetostrictive sensor (9) in the grounding load computing unit (40c) of the processing means (40) by storing the linear equation on the memory beforehand. The amount of variation of the grounding load thus obtained is outputted to the vehicle control means, and a control appropriate for the vehicle is performed.

The relationship between the output of the magnetostrictive sensor obtained by detecting the strain in a tensile direction and the left-and-right directional tire grounding load is same as that shown in FIG. 9, that is, the strain (magnetostrictive sensor output voltage changing amount) and the lateral G (left-and-right directional tire grounding load) are in a linear relationship. Therefore, by calculating the relational equation (a and b in y=ax+b) between the sensor output and the left-and-right directional tire grounding load beforehand, it is possible to obtain the left-and-right directional tire grounding load from the tensile strain in the axial direction of the inner ring (17).

Figure 3:
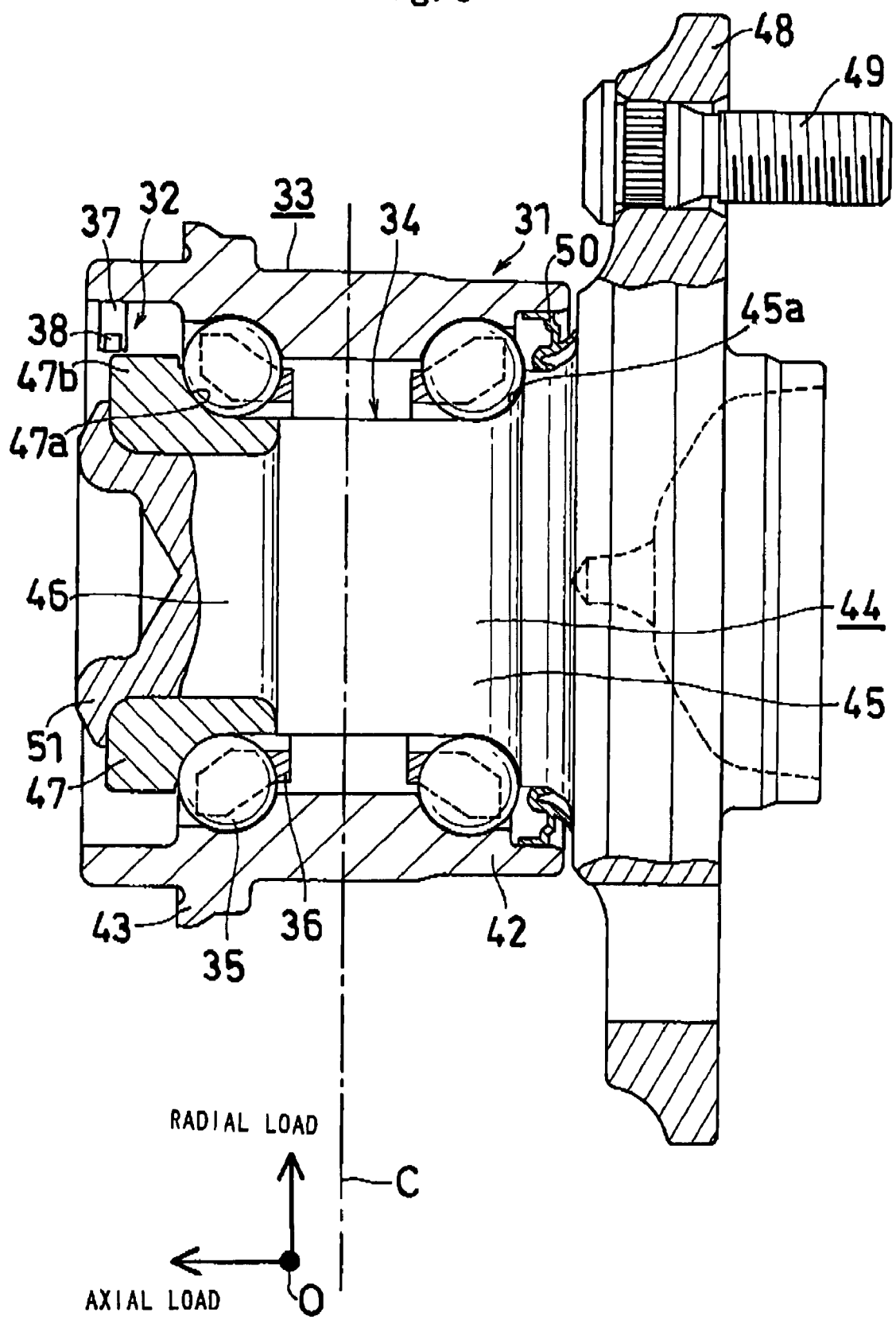
FIG. 3 is a vertical sectional view showing a third embodiment of the hub unit with a sensor according to the first aspect of the present invention.

FIG. 3 shows a third embodiment of the hub unit with a sensor of the first aspect of the present invention.

The hub unit with a sensor comprises a hub unit (31) and a sensor device (32) for detecting the rotation thereof and the grounding load.

The hub unit (31) includes a body-side raceway member (33) to be fixed on the vehicle body side, a wheel-side raceway member (34) to which a wheel is to be mounted, a plurality of balls (35) which are rolling elements disposed in two rows between the both members (33) and (34), and cages (36) for holding the respective rows of balls (35).

The body-side raceway member (33) has an outer ring (fixed ring) function of a bearing, and includes a cylindrical part (42) in which two rows of outer ring raceways are formed on the inner peripheral face, and a flange part (43) which is provided near the left end part of the cylindrical part (42) and mounted with bolts to a suspension device (vehicle body).

The wheel-side raceway member (34) consists of an inner shaft (44) having a large diameter part (45) with a first raceway groove (45a) and a small diameter part (46) with an outer diameter smaller than the first raceway groove (45a), and an inner ring (47) in which the right face fitted to the outer diameter of the small diameter part (46) of the inner shaft (44) closely contacts the left face of the large diameter part (45) of the inner shaft (44). Near the right end of the inner shaft (44), there is provided a flange part (48) to which a plurality of bolts (49) for mounting a wheel are fixed. On the right part of the inner ring (47), a raceway groove (47a) is formed so as to be in parallel with the raceway groove (45a) of the inner shaft (44), and a shoulder part (47b) is formed on the left part of the inner ring (47). A seal device (50) is provided between the right end part of the body-side raceway member (33) and the inner shaft (44). The left end part of the small diameter part (46) of the inner shaft (44) is caulked, and the inner ring (47) is fixed to the inner shaft (44) with the caulking unit (51).

The sensor device (32) includes a support member (37) mounted to the body-side raceway member (33), a magnetostrictive sensor (38) mounted to the support member (37), and a processing means (not shown in FIG. 3, see FIG. 7) for processing the output of the magnetostrictive sensor (38). The magnetostrictive sensor (38) is a magnetic impedance sensor, and the sensing surface thereof is made to face the left end face of the uppermost part of the inner ring (17) from the outside in the radial direction so as to measure the tensile strain on the left end face of the uppermost part of the inner ring (17) of the wheel-side raceway member (4).

When the grounding load is acted on a tire, compression or tensile strain is caused in each part of the hub unit (31). Generally, a plumb line (C) running through the center of the two rows of balls (35) of the hub unit (31) is outside in the axial direction from a plumb line running through the center (0) of the tire. In the hub unit (31) including the wheel-side raceway member (44) consisting of the inner shaft (44) and the inner ring (47), relatively large strain is caused in the inner ring (47) near the vehicle body side. The strain of the inner ring (47) becomes the maximum strain in a tensile direction in the uppermost part opposite to the grounding center. The magnetostrictive sensor (38) shows the maximum sensitivity with respect to the compression strain when it is made to face from a direction orthogonal thereto, and shows the maximum sensitivity with respect to the tensile strain when it is made to face from the same direction thereof. Therefore, as shown in FIG. 3, a large inverse magnetostrictive effect is detected by disposing the magnetostrictive sensor (38) just outside the uppermost part of the inner ring shoulder part (47*b*) of the magnetostrictive sensor (38) so as to detect the tensile strain in the radial direction of the inner ring (47).

Figure 4:
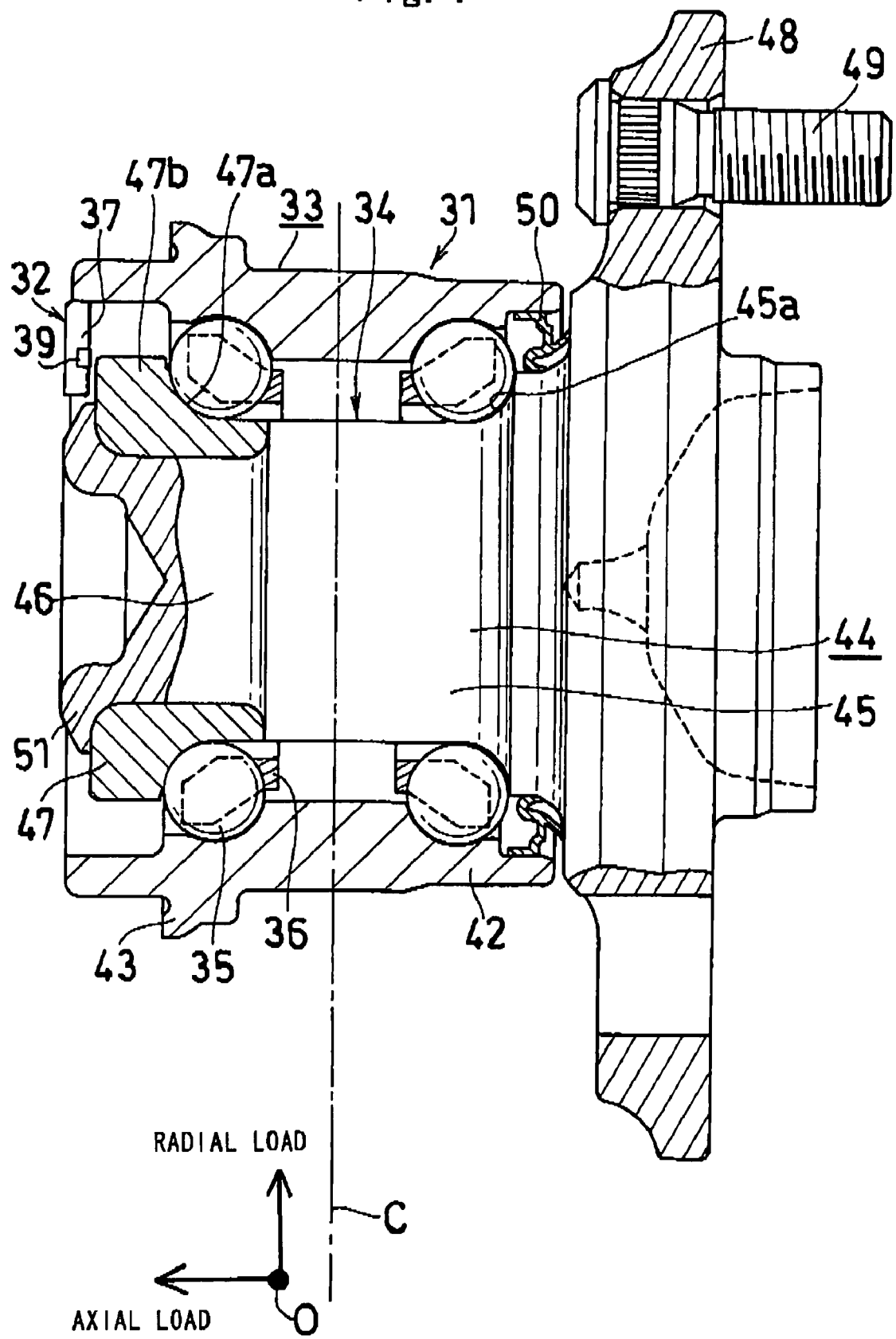
FIG. 4 is a vertical sectional view showing a fourth embodiment of the hub unit with a sensor according to the first aspect of the present invention.

FIG. 4 shows a fourth embodiment of the hub unit with a sensor of the first aspect of the present invention. In the hub unit with a sensor of the fourth embodiment, the configuration of the sensor device is different from that of the third embodiment. In the explanation below, the same configuration is denoted by the same reference numeral, and the explanation is omitted.

The sensor device (32) of the hub unit with a sensor of the fourth embodiment includes a support member (37) mounted to the body-side raceway member (33), a magnetostrictive sensor (39) mounted to the support member (37), and a processing means (not shown in FIG. 4, see FIG. 7) for processing output of the magnetostrictive sensor (39) The magnetostrictive sensor (39) is a magnetic impedance sensor, and the sensing surface thereof is made to face the left end face of the uppermost part of the inner ring shoulder part (47*b*) of the wheel-side raceway member (34) from the left side in the axial direction so as to measure the tensile strain on the outer peripheral face of the uppermost part of the inner ring (17) of the wheel-side raceway member (4). In this way, a large inverse magnetostrictive effect is detected by disposing the magnetostrictive sensor (39) on just left side of the uppermost part of the inner ring shoulder part (47*b*) of the magnetostrictive sensor (39) so as to detect the tensile strain in the axial direction of the inner ring (47).

The processing means of the third and fourth embodiments are same as those of the first and second embodiments shown in FIG. 7; therefore, their explanations are omitted.

Figure 8:
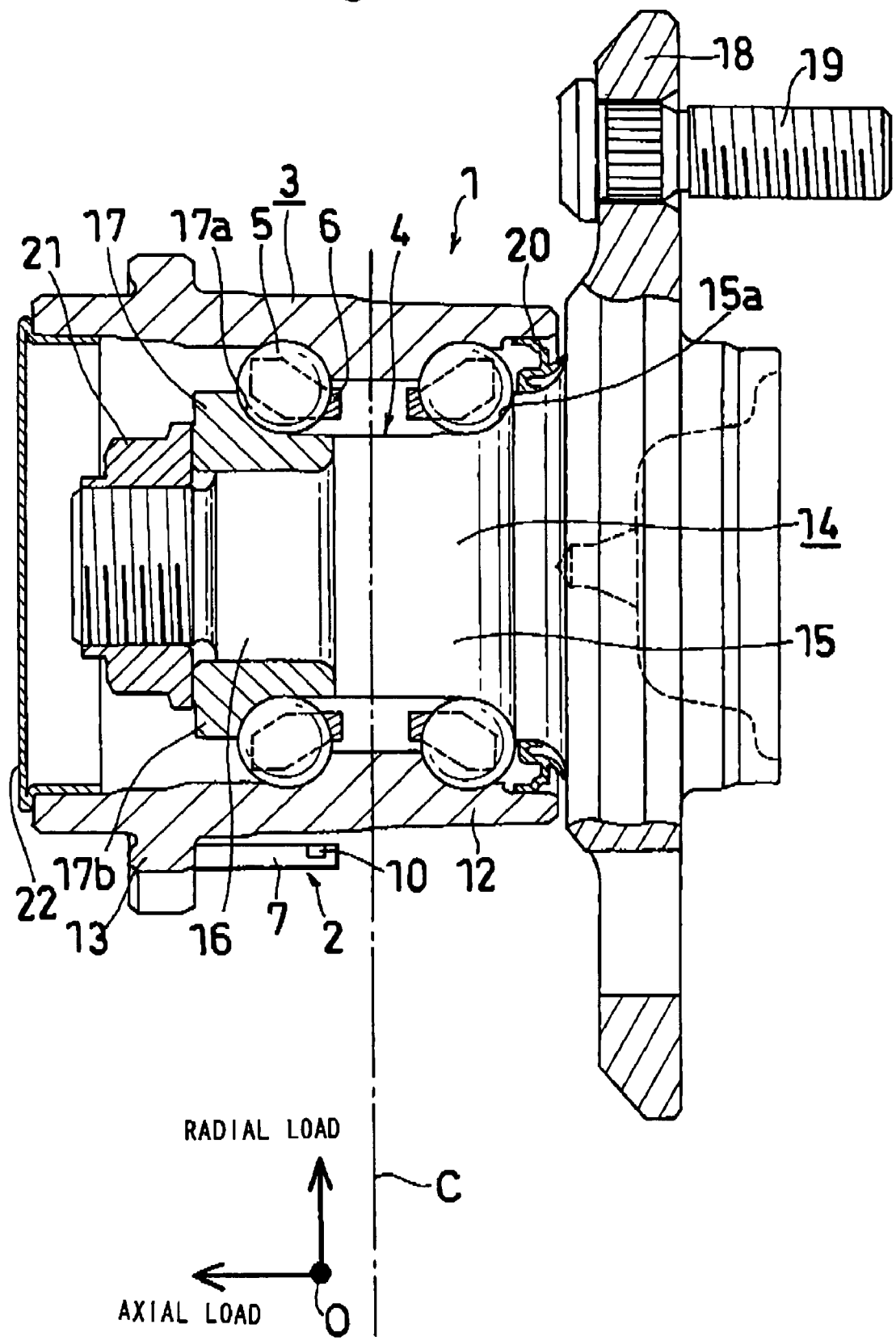
FIG. 8 is a vertical sectional view showing a fifth embodiment of the hub unit with a sensor according to the first aspect of the present invention.

FIG. 8 shows a fifth embodiment of the hub unit with a sensor of the first aspect of the present invention. In the hub unit with a sensor of the fifth embodiment, the configuration of the sensor device is different from that of the first embodiment. In the explanation below, the configuration same as that of the first embodiment is denoted by the same reference numeral, and the explanation is omitted.

The sensor device (2) includes a support member (7) mounted to the body-side raceway member (3), a magnetostrictive sensor (10) mounted to the support member (7), and a processing means (not shown in FIG. 8, see FIG. 7) for processing the output of the magnetostrictive sensor (10). The magnetostrictive sensor (10) is a magnetic impedance sensor, and the sensing surface thereof is made to face the outer peripheral face of the lowermost part of the body-side raceway member (3) from the outside in the radial direction.

When grounding loads (radial load and axial load) are acted on a tire, compression or tensile strain is caused in each part of the hub unit (1). In general, a plumb line (C) running through the center between the two rows of balls (5) of the hub unit (1) is located outside in the axial direction from a plumb line running through the center (0) of the tire. In the body-side raceway member (3) of the hub unit (1), relatively large strain is caused near the plumb line running through the center between the two rows of balls (5). The strain of the body-side raceway member (3) becomes the maximum strain in a compression direction in the lowermost part which is the grounding center side, and becomes the maximum strain in a tensile direction in the uppermost part opposite to the grounding center. The magnetostrictive sensor (10) shows the maximum sensitivity with respect to the compression strain when it is made to face from a direction orthogonal thereto, and shows the maximum sensitivity with respect to the tensile strain when it is made to face from the same direction thereof. Accordingly, as shown in FIG. 8, by disposing the magnetostrictive sensor (10) just outside the outer peripheral face of the ball nearby part of the body-side raceway member (3) so as to detect the compression strain in the axial direction of the body-side raceway member (3), a large inverse magnetostrictive effect is detected.

The relationship between the output of the magnetostrictive sensor and the left-and-right directional tire grounding load shown in FIG. 9 is also established as to the relationship between the output of the magnetostrictive sensor obtained by detecting the strain in a compression direction in this embodiment and the left-and-right directional tire grounding load. As shown in the same figure, the strain in the compression direction (magnetostrictive sensor output voltage changing amount) and the lateral G (left-and-right directional tire grounding load) are in a linear relationship. Therefore, by calculating the relational equation between the sensor output and the left-and-right directional tire grounding load (a and b in $y=ax+b$) beforehand, it is possible to obtain the left-and-right directional tire grounding load from the strain in the compression direction of the body-side raceway member (3).

Note that although, in the fifth embodiment, the magnetostrictive sensor (10) is made to face the vicinity of the balls (5) of the left row, it is possible to achieve an effect similar to that described above by providing the magnetostrictive sensor (10) at a location near the right row of balls (5) which is a location symmetrical thereto over the plumb line (C) running through the center between the two rows of balls (5) and the location.

Further, for the support members (7) and (37) supporting the magnetostrictive sensors (8), (9), (38), (39) and (10) in the respective embodiments, mounting positions and shapes thereof are not limited particularly.

In each of the first to fifth embodiments, the body-side raceway member (3) and the wheel-side raceway member (4) are made of carbon steel for mechanical configuration (S55C) which is an iron magnetic material, the rolling members (5) are made of a high-carbon chromium bearing steel (SUJ2) or made of ceramics, and the cage (6) is made of resin (polyamide 66). Here, in a case where the rolling members (5) are made of ceramics, although the body-side raceway member (3) and the wheel-side raceway member (4) have magnetic properties, the rolling members (5) and the cages (6) are formed of non-magnetic materials. Therefore, although they come close to or go away from the magnetostrictive sensors (8), (9) and (10) along with the rotation of the inner ring (17) and the inner shaft (14), no influence is caused to the magnetic fields of the vicinity of the shoulder part (17*b*) of the inner ring (17) and the ball nearby part of the body-side raceway member (3). Therefore, no error (noise) is caused due to rotation of the balls (5) and the cages (6), whereby it is possible to reduce the error included in data detected by the magnetostrictive sensors (8), (9) and (10) to be very small. In this way, in the hub unit with a sensor, it is possible to obtain rotation of the hub unit (1) (number of rotations, rotational velocity, rotational angle, etc.) by the magnetostrictive sensors (8), (9) and (10), and also to detect the force applied to the hub unit (1) with high accuracy.

Next, explanation will be given for a hub unit with a sensor of a second aspect of the present invention.

Figure 10:
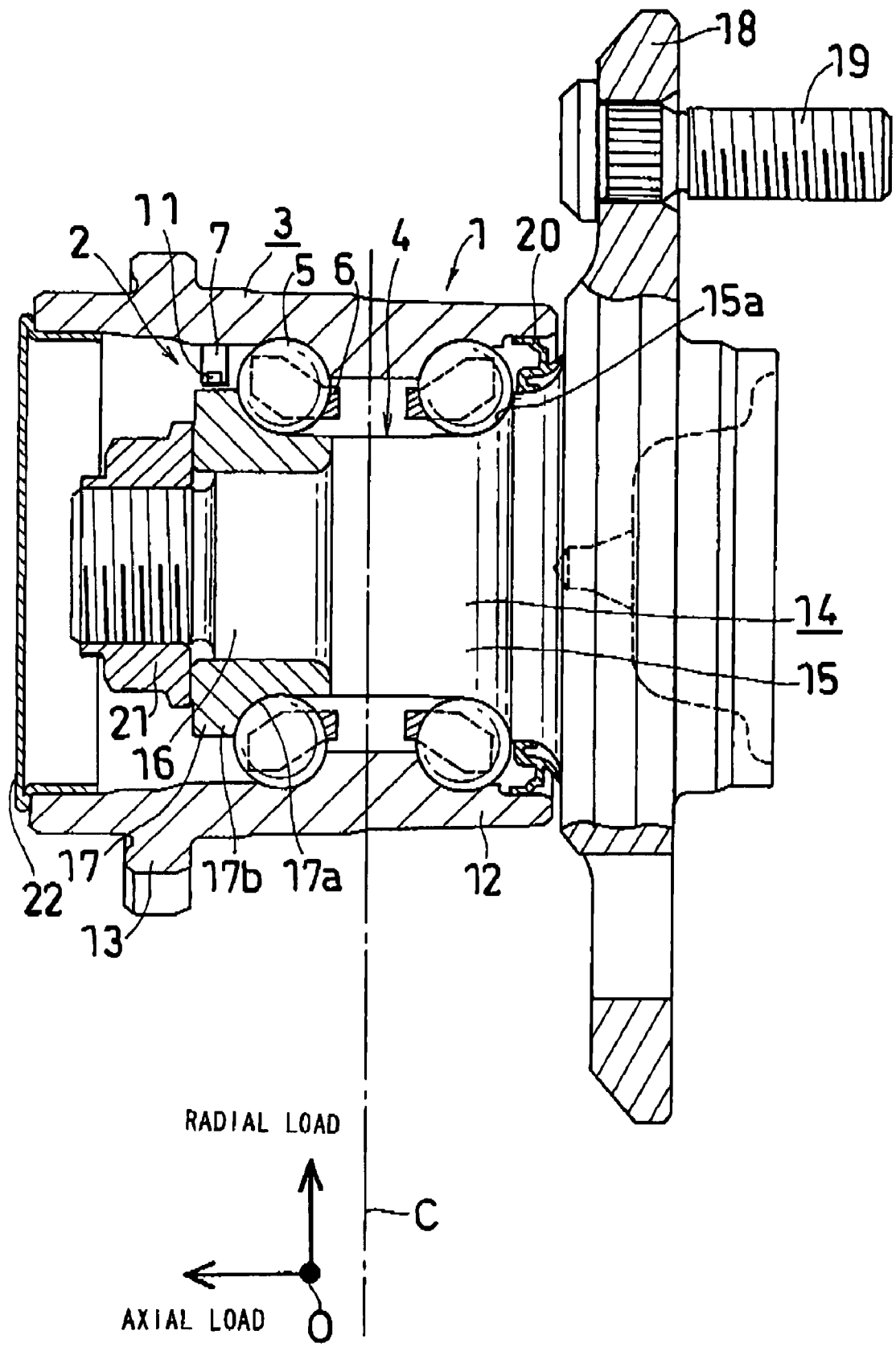
FIG. 10 is a vertical sectional view showing a first embodiment of a hub unit with a sensor according to a second aspect of the present invention.

FIG. 10 shows a first embodiment of the hub unit with a sensor of the second aspect of the present invention. Although a sensor is the magnetostrictive sensor (8) in FIG. 1, a displacement sensor (11) is used instead of the magnetostrictive sensor in this embodiment. With this displacement sensor (11), it is adapted that displacement in the radial direction on the outer peripheral face of the shoulder part (17b) of the inner ring (17) is detected. Note that in FIG. 10, components other than the sensor (11) are same as those shown in FIG. 1, and the same configurations are denoted by the same reference numerals; therefore, the explanations are omitted.

Figure 11:
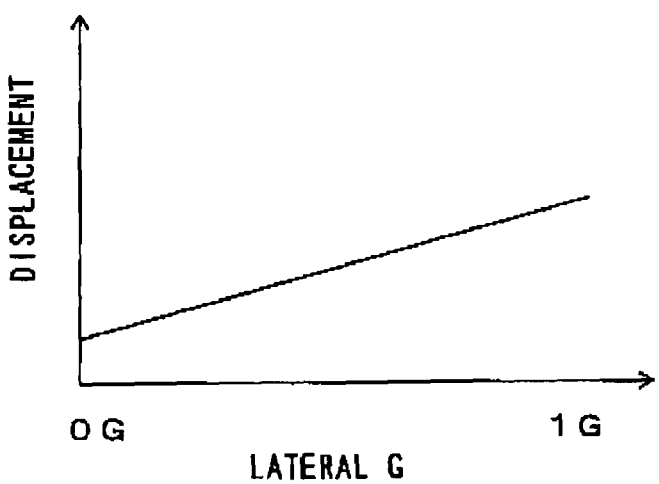
FIG. 11 is a graph showing the relationship between the output of a displacement sensor and the lateral G in the first embodiment of the second aspect of the present invention.

FIG. 11 shows a result of examining the relationship between the output of the displacement sensor (11) obtained by detecting displacement in the radial direction described above and the left-and-right directional tire grounding load. As shown in the same figure, the displacement and the lateral G (left-and-right directional tire grounding load) are in a linear relationship. Therefore, by calculating the relational equation between the sensor output and the left-and-right directional tire grounding load (a and b in y=ax+b), beforehand it is possible to obtain the left-and-right directional tire grounding load from the strain in the radial direction of the shoulder part of the inner ring. Although a block diagram of a sensor device having the displacement sensor (11) is not shown, it is almost similar to that shown in FIG. 7.

Note that in the first embodiment of the hub unit with a sensor of the second aspect of the present invention, the displacement sensor (11) may be shifted 180° from the position shown in FIG. 10 and the displacement of the outer peripheral face of the shoulder part (17b) of the inner ring (17) in the lowermost part may be measured. Even in this case, an effect similar to that described above can be achieved.

A second embodiment of the hub unit with a sensor of the second aspect of the present invention is one in which the magnetostrictive sensor (10) in FIG. 8 is replaced with a displacement sensor, and it is adapted to detect the displacement in the radial direction of the outer peripheral face of the body-side raceway member (3) with this displacement sensor. The drawing of this embodiment is same as FIG. 8 although the internal configuration of the sensor is different, so the drawing is omitted.

Figure 13:
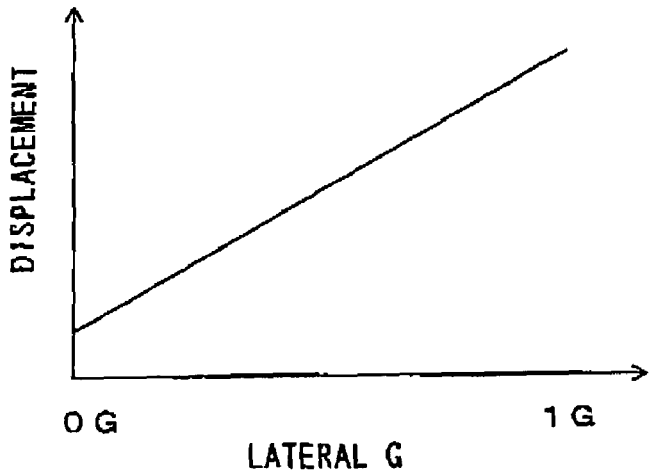
FIG. 13 is a graph showing the relationship between the output of a displacement sensor and the lateral G in second and third embodiments of the second aspect of the present invention.

FIG. 13 shows the result of examining the relationship between the output of the displacement sensor obtained by detecting the displacement in the radial direction of the body-side raceway member (3) and the left-and-right directional tire grounding load. As shown in the same figure, the displacement and the lateral G (left-and-right directional tire grounding load) is in a linear relationship. Therefore, by calculating the relational equation between the sensor output and the left-and-right directional tire grounding load (a and b in y=ax+b) beforehand, it is possible to obtain the left-and-right directional tire grounding load from the displacement in the radial direction of the body-side raceway member.

Figure 12:
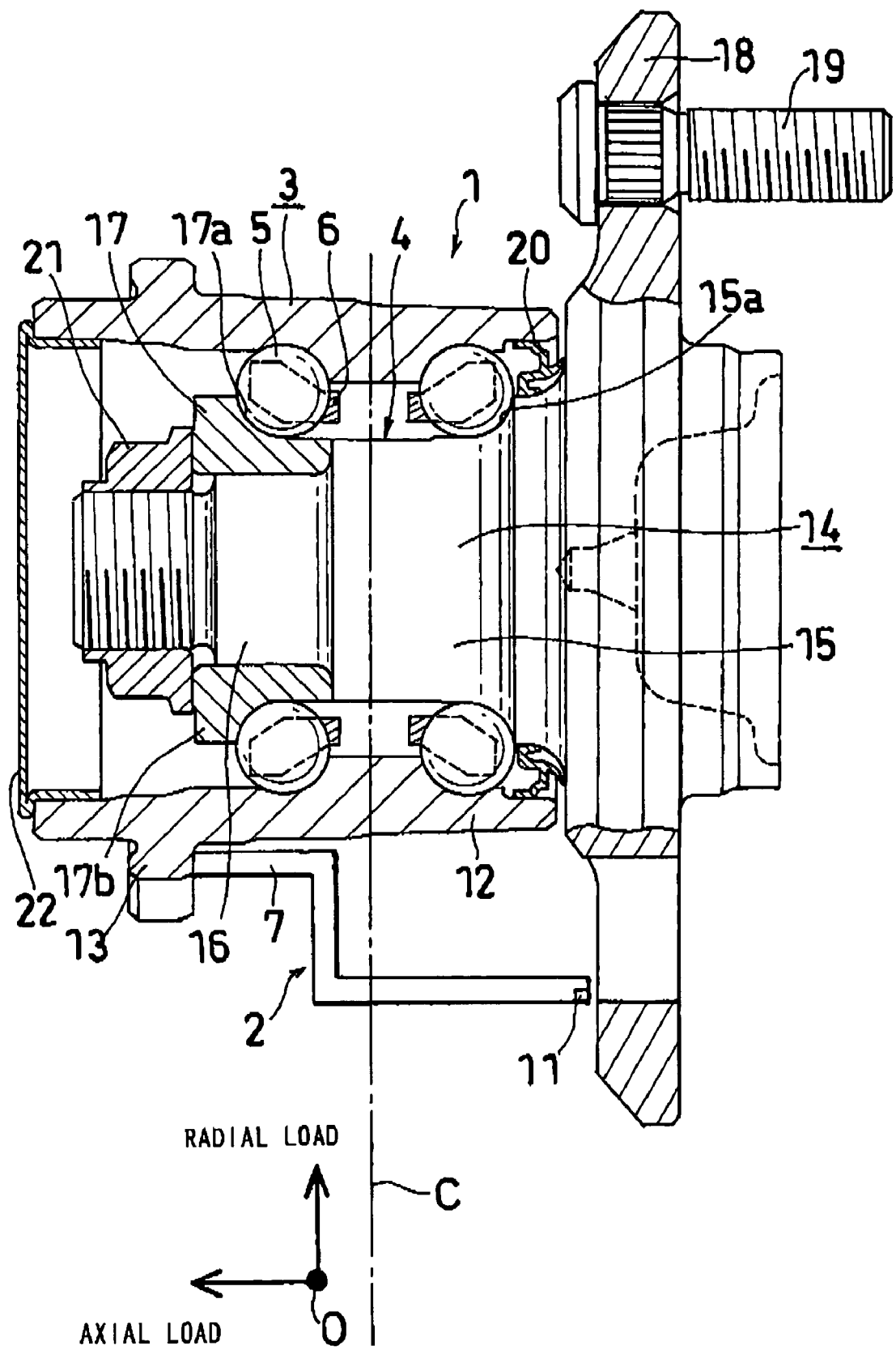
FIG. 12 is a vertical sectional view showing a third embodiment of the hub unit with a sensor according to the second aspect of the present invention.

FIG. 12 shows a third embodiment of the hub unit with a sensor of the second aspect of the present invention. The hub unit with a sensor of the third embodiment is one adapted to detect displacement in the axial direction of a flange (18) of the body-side raceway member (3) by the displacement sensor (11). In FIG. 12, configurations same as those in the first embodiment shown in FIG. 10 are denoted by the same reference numerals and their explanations are omitted.

The sensor device (2) includes the support member (7) mounted to the body-side raceway member (3), the displacement sensor (11) mounted to the support member (7) and a processing means (not shown) for processing output of the displacement sensor (11). The displacement sensor (11) is made to face the left side face of the flange (18) of the body-side raceway member (3) from the inside (left side) in the axial direction.

The relationship between the output of the displacement sensor (11) and the left-and-right directional tire grounding load in the third embodiment is similar to that shown in FIG. 13. Therefore, by calculating the relational equation of the sensor output and the left-and-right directional tire grounding load (a and b in y=ax+b) beforehand, it is possible to obtain the left-and-right directional tire grounding load from the displacement in the axial direction of the flange (18) of the body-side raceway load (13).

In the second and third embodiments of the hub unit with a sensor of the second aspect of the present invention, the displacement sensor (11) may be shifted by 180° from the position shown in the figure and the displacement of the outer diameter or the flange (18) of the body-side raceway member (3) in the uppermost part may be measured. Even in this case, an effect same as that described above can be achieved.

Further, as for the support member (7) for supporting the displacement sensor (11) in each embodiment, the mounting position and the shape are not limited particularly. However, it is preferable that the base part of the support member (7) be fixed in the vicinity of the part fixed to the vehicle body of the body-side raceway member (3).

In each of the embodiments described above, the number of the magnetostrictive sensors (8), (9), (38), (39) or (10) or the displacement sensor (11) may be one, or in order to obtain data as much as possible with high accuracy, the magnetostrictive sensors or the displacement sensors may be placed on a plurality of locations on the periphery. As a preferred embodiment for a case where the number of the sensors (8), (9), (10) and (11) is plural, a hub unit with three magnetostrictive sensors and a hub unit with two displacement sensors will be explained below.

Figure 16:
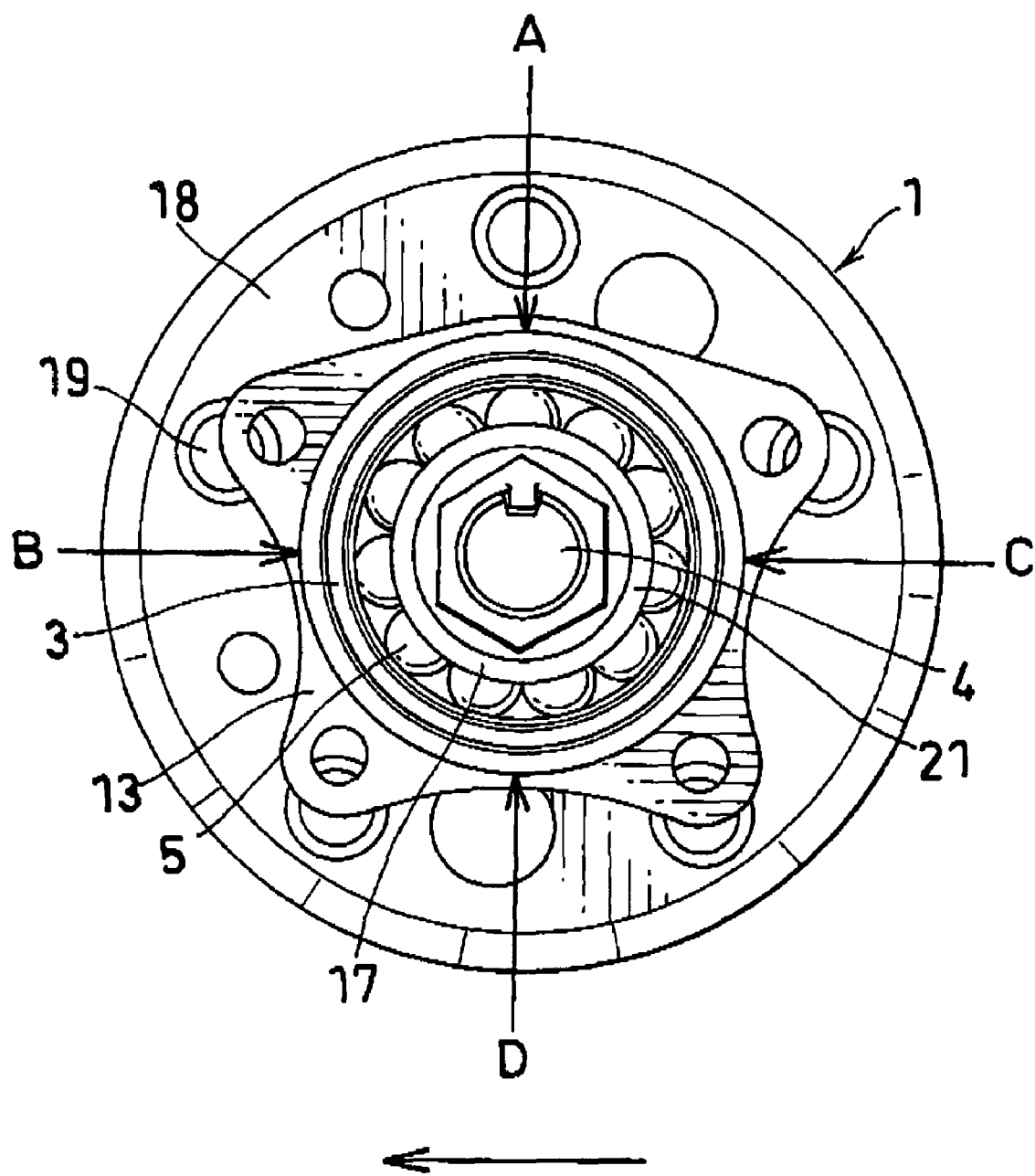
FIG. 16 is a diagram showing the hub unit with a sensor of each embodiment viewed from the inside in the axial direction, for explaining disposing position in the radial direction of the sensor of each embodiment.

A first embodiment of the hub unit with three magnetostrictive sensors is so configured that the magnetostrictive sensors (8) same as that of the first embodiment shown in FIG. 1 are provided on three locations shown as A, B and C in FIG. 16. In FIG. 16, the traveling direction is set to a left direction in the figure as shown by an arrow; therefore, B corresponds to the front side of the vehicle and C corresponds to the rear side of the vehicle. The sensing surface of the magnetostrictive sensor (8) provided on the position A in FIG. 16 is made to face the left end face of the uppermost part of the inner ring (17) from the outside in the radial direction so as to measure the tensile strain in the left end face of the uppermost part of the inner ring (17) of the wheel side raceway member (4) as shown in FIG. 1. The sensing surfaces of the magnetostrictive sensors (not shown in FIG. 1), provided on the positions B and C in FIG. 16, are made to face the left end face of the intermediate part of the inner ring (17) from the outside in the radial direction so as to measure the tensile strain in the left end face of the intermediate part of the inner ring (17) of the wheel-side raceway member (4) in the intermediate part between the uppermost part and the lowermost part of the inner ring shoulder part (17b) of the wheel-side raceway member (4).

The magnetostrictive sensor (8) provided at the position A in FIG. 16 is same as that of the first embodiment; therefore, it is possible to obtain the left-and-right directional tire grounding load from this sensor (8) as described in detail in the part describing the first embodiment.

If the load acted on the tire is in a front-and-back direction, the strain of the inner ring (17) becomes the maximum in the intermediate part between the uppermost part and the lowermost part (positions B and C in FIG. 16). When the vehicle is decelerated, strain in the tensile direction is caused at the position B in FIG. 16, and when the vehicle is accelerated, strain in the tensile direction is caused at the position C in FIG. 16. As described above, the magnetostrictive sensor (8) shows the maximum sensitivity with respect to the compression strain when it is made to face from a direction orthogonal thereto, and shows the maximum sensitivity with respect to the tensile strain when it is made to face from the same direction thereto. Therefore, by disposing the magnetostrictive sensor (8) just outside the inner ring shoulder part (17b) so as to detect the tensile strain in the radial direction of the inner ring shoulder part (17b) in the intermediate part between the uppermost part and the lowermost part, it is possible to detect a large inverse magnetostrictive effect at the position B in FIG. 16 when decelerated and at the position C in FIG. 16 when accelerated, respectively.

Figure 14:
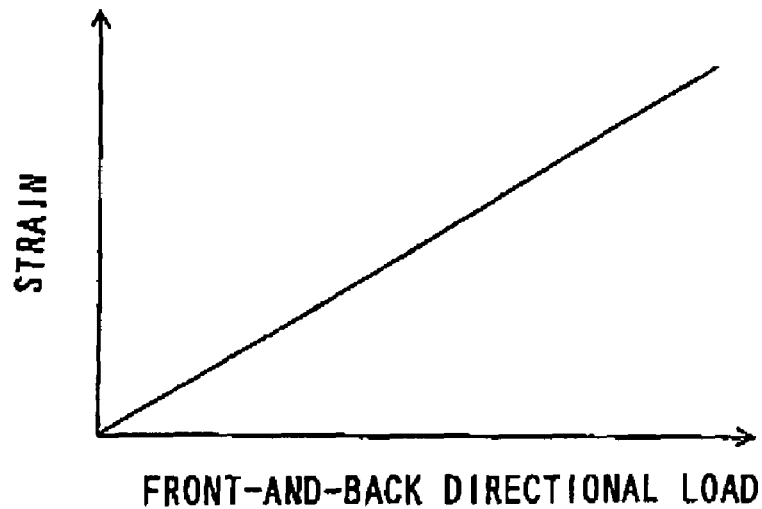
FIG. 14 is a graph showing the relationship between the output of a magnetostrictive sensor and front-and-back directional tire grounding load in a hub unit with three magnetostrictive sensors.

FIG. 14 shows a result of examining the relationship between the output of the magnetostrictive sensor disposed at the position B in FIG. 16 when decelerated and the front-and-back directional tire grounding load. As shown in the same figure, the strain (magnetostrictive sensor output voltage changing amount) and the front-and-back directional tire grounding load are in a proportional relationship. Therefore, by calculating the relational equation between the sensor output and the front-and-back directional tire grounding load when decelerated (a in y=ax) beforehand, it is possible to obtain the front-and-back directional tire grounding load when decelerated from the tensile strain in the radial direction of the inner ring (17) disposed at the position B in FIG. 16. When accelerated, the relationship between the output of the magnetostrictive sensor disposed at the position C in FIG. 16 and the front-and-back directional tire grounding load becomes similar to that in FIG. 14. Therefore, by calculating the relational equation between the sensor output and the front-and-back directional tire grounding load when accelerated (a in y=ax) beforehand, it is possible to obtain the front-and-back directional tire grounding load when accelerated from the tensile strain in the radial direction of the inner ring (17) disposed at the position C in FIG. 16.

A second embodiment of the hub unit with three magnetostrictive sensors is so configured that the magnetostrictive sensors (9) same as those of the second embodiment shown in FIG. 2 are provided at three positions A, B and C in FIG. 16. The sensing surface of the magnetostrictive sensor (9) provided at the position A in FIG. 16 is made to face the uppermost part of the inner ring shoulder part (17b) of the wheel-side raceway member (4) from the left side in the axial direction so as to measure the tensile strain in the outer peripheral face of the uppermost part of the inner ring (17) of the wheel-side raceway member (4), as shown in FIG. 2. The sensing surfaces of the magnetostrictive sensors (not shown in FIG. 2) provided at positions B and C in FIG. 16 are made to face the inner ring shoulder part (17b) from the left side in the axial direction in the intermediate part between the uppermost part and the lowermost part of the inner ring shoulder part (17b) of the wheel-side raceway member (4) so as to measure the tensile strain in the outer peripheral face of the intermediate part of the inner ring (17) of the wheel-side raceway member (4).

Since the magnetostrictive sensor (9) provided at the position A in FIG. 16 is same as that of the second embodiment, it is possible to obtain the left-and-right directional tire grounding load from this sensor (9) as described in detail in the part describing the second embodiment.

If the load acted on the tire is in a front-and-back direction, when the vehicle is decelerated, strain in a tensile direction is caused at the position B in FIG. 16, and when the vehicle is accelerated, strain in a tensile direction is caused at the position C in FIG. 16. Therefore, by disposing the magnetostrictive sensor (9) on just left side of the inner ring shoulder part (17b) so as to detect the tensile strain in the axial direction of the inner ring shoulder part (17b) in the intermediate part between the uppermost part and the lowermost part, a large inverse magnetostrictive effect is detected at the position B in FIG. 16 when decelerated and at the position C in FIG. 16 when accelerated, respectively. In this case, the strain (magnetostrictive sensor output voltage changing amount) and the front-and-back directional tire grounding load are same as those shown in FIG. 14. Therefore, by calculating the relational equation of the sensor output and the front-and-back directional tire grounding load when decelerated (a in y=ax), beforehand it is possible to obtain the front-and-back directional tire grounding load when decelerated from the tensile strain in the axial direction of the inner ring (17) disposed at the position B in FIG. 16. When accelerated, the relationship between the output of the magnetostrictive sensor disposed at the position C in FIG. 16 and the front-and-back directional tire grounding load becomes similar to that shown in FIG. 14. Therefore, by calculating the relational equation of the sensor output and the front-and-back directional tire grounding load when accelerated (a in y=ax) beforehand, it is possible to obtain the front-and-back directional tire grounding load when accelerated from the tensile strain in the axial direction of the inner ring (17) disposed at the position C in FIG. 16.

A third embodiment of the hub unit with three magnetostrictive sensors is so configured that magnetostrictive sensors (10) sate as that of the fifth embodiment shown in FIG. 8 are provided at three locations of B, C and D in FIG. 16. The sensing surface of the magnetostrictive sensor (10) provided at the position D in FIG. 16 is made to face the outer peripheral face of the lowermost part of the body-side raceway member (3) from the outside in the radial direction as shown in FIG. 8. The sensing surfaces of the magnetostrictive sensors (not shown in FIG. 8) provided at the positions B and C in FIG. 16 are made to face the outer peripheral face from the outside in the radial direction in the intermediate part between the uppermost part and the lowermost part of the body-side raceway member (3).

The magnetostrictive sensor (10) provided at the position D in FIG. 16 is same as that of the fifth embodiment; therefore, it is possible to obtain the left-and-right directional tire grounding load from this sensor (10) as described in detail in the part describing the fifth embodiment.

If the load acted on the tire is in a front-and-back direction, the strain of the body-side raceway member (3) becomes the maximum in the intermediate part between the uppermost part and the lowermost part (positions B and C in FIG. 16). When the vehicle is decelerated, it becomes strain in a compression direction at the position C in FIG. 16, and when the vehicle is accelerated, it becomes strain in a compression direction in the position B in FIG. 16. As described above, the magnetostrictive sensor (10) shows the maximum sensitivity with respect to the compression strain when it is made to face from a direction orthogonal thereto, and shows the maximum sensitivity with respect to the tensile strain when it is made to face from the same direction thereto. Therefore, by disposing the magnetostrictive sensor (10) just outside the body-side raceway member (3) so as to detect compression strain in the axial direction of the body-side raceway member (3) in the intermediate part between the uppermost part and the lowermost part, a large inverse magnetostrictive effect is detected at the position C in FIG. 16 when decelerated and at the position B in FIG. 16 when accelerated, respectively.

When decelerated, the relationship between the output of the magnetostrictive sensor disposed at the position C in FIG. 16 and the front-and-back directional tire grounding load is similar to that shown in FIG. 14. As shown in the same figure, the strain (magnetostrictive sensor output voltage changing amount) and the front-and-back directional tire grounding load is in a linear relationship. Therefore, by calculating the relational equation of the sensor output and the front-and-back directional tire grounding load when decelerated (a and b in y=ax+b) beforehand, it is possible to obtain the front-and-back directional tire grounding load when decelerated from the compression strain in the axial direction of the body-side raceway member (3) disposed at the position C in FIG. 16. The relationship, when accelerated, between the output of the magnetostrictive sensor disposed at the position B in FIG. 16 and the front-and-back directional tire grounding load also becomes similar to that shown in FIG. 14. Therefore, by calculating the relational equation of the sensor output and the front-and-back directional tire grounding load when accelerated (a in y=ax) beforehand, it is possible to obtain the front-and-back directional tire grounding load when accelerated from the compression strain in the axial direction of the body-side raceway member (3) disposed at the position B in FIG. 16.

A first embodiment of the hub unit with two displacement sensors is so configured that the displacement sensors (11) same as that of the first embodiment shown in FIG. 10 are provided at the position A and at either the position B or the position C in FIG. 16, one for each.

Since the displacement sensor (11) provided at the position A in FIG. 16 is same as that of the first embodiment, it is possible to obtain the left-and-right directional tire grounding load from this sensor (11) as described in detail in the part describing the first embodiment.

Figure 15:
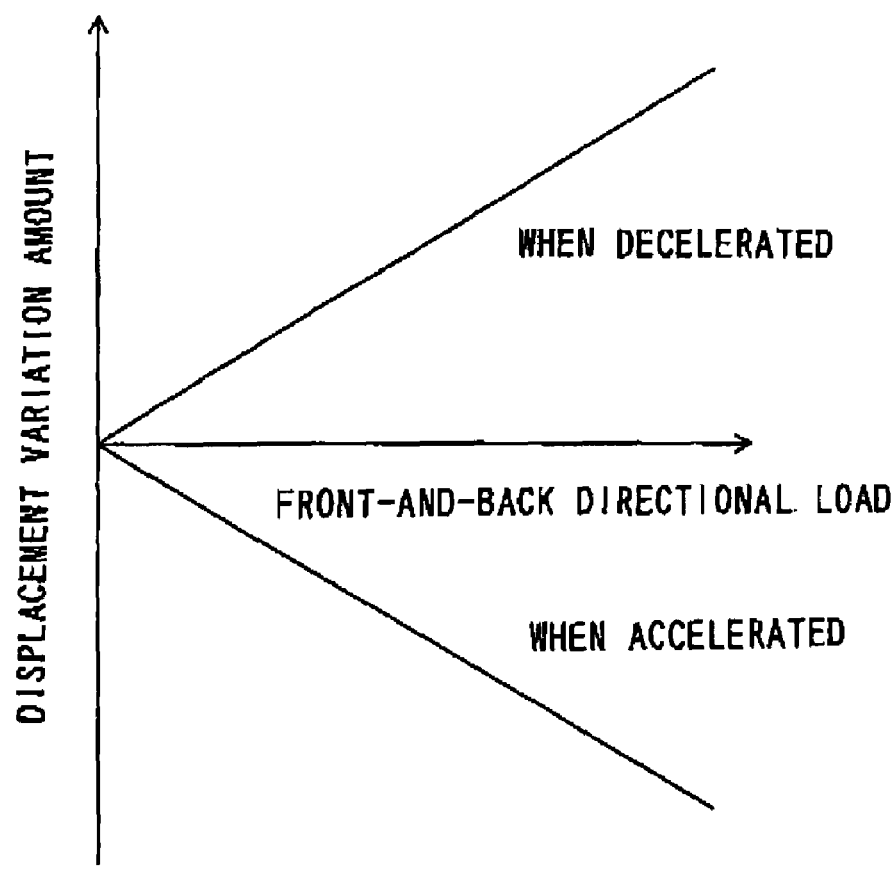
FIG. 15 a graph showing the relationship between the output of a displacement sensor and front-and-back directional tire grounding load in a hub unit with two displacement sensors.

FIG. 15 shows a result of examining the relationship between the output of the displacement sensor (8) disposed at the position B or C in FIG. 16 and the front-and-back directional tire grounding load. As shown in the same figure, the displacement change amount and the front-and-back directional tire grounding load are in a proportional relationship in either decelerated case or accelerated case. Therefore, by calculating the relational equation of the sensor output and the front-and-back directional tire grounding load (a in y=ax) beforehand, it is possible to obtain the front-and-back directional tire grounding load from the displacement in the radial direction of the inner ring shoulder part (17b).

Note that in the first embodiment of the hub unit with two displacement sensors, the displacement sensor (11) for obtaining the left-and-right directional tire grounding load may be provided at the position D shown in FIG. 16. Even in this case, an effect same as that described above can be obtained.

A second embodiment of the hub unit with two displacement sensors are so configured that displacement sensors same as that of the second embodiment explained with reference to FIG. 8 are provided at the position A and at either the position B or the position C in FIG. 16, one for each.

Since the displacement sensor provided at the position A in FIG. 16 is same as that of the second embodiment, it is possible to obtain the left-and-right directional tire grounding load from this sensor (11) as described in detail in the part describing the second embodiment.

The relationship between the output of the displacement sensor disposed at the position B or C in FIG. 16 and the front-and-back directional tire grounding load becomes similar to that shown in FIG. 15. As shown in the same figure, the displacement change amount and the front-and-back directional tire grounding load are in a proportional relationship in either a decelerated case or an accelerated case. Therefore, by calculating the relational equation between the sensor output and the front-and-back directional tire grounding load (a in y=ax), beforehand it is possible to obtain the front-and-back directional tire grounding load from the displacement in the radial direction of the body-side raceway member (3).

A third embodiment of the hub unit with two displacement sensors is so configured that displacement sensors (11) same as that of the third embodiment shown in FIG. 12 are provided at the position D and either the position B or the position C in FIG. 16, one for each. As shown in FIG. 12, the sensing surface of the displacement sensor (11) provided at the position D in FIG. 16 is made to face the left side face of the flange (18) of the body-side raceway member (3) from the inside in the axial direction. The sensing surface of the displacement sensor provided at the position B or C in FIG. 16 (not shown in FIG. 12) is made to face the left side face thereof from the inside in the axial direction in the intermediate part between the uppermost part and the lowermost part of the body-side raceway member (3).

Since the displacement sensor (11) provided at the position D in FIG. 16 is same as that of the third embodiment, it is possible to obtain the left-and-right directional tire grounding load from this sensor (11) as described in detail in the part describing the third embodiment.

Further, the relationship between the output of the displacement sensor (11) disposed at the position B or C in FIG. 16 and the front-and-back directional tire grounding load is similar to that shown in FIG. 15. Therefore, by calculating the relational equation between the sensor output and the front-and-back directional tire grounding load (a in y=ax) beforehand, it is possible to obtain the front-and-back directional tire grounding load from the displacement in the axial direction of the flange (18) of the body-side raceway member (3).

Note that in the second and third embodiments of the hub unit with two displacement sensors, the displacement sensors (10) and (11) for obtaining the left-and-right directional tire grounding load may be provided at the position A shown in FIG. 16. Even in this case, an effect similar to that described above can be achieved.

Next, as preferred embodiments in a case of reducing the number of the sensors (8), (9), (10) and (11) as small as possible, a hub unit with only one magnetostrictive sensor and a hub unit with only one displacement sensor will be explained.

Figure 17:
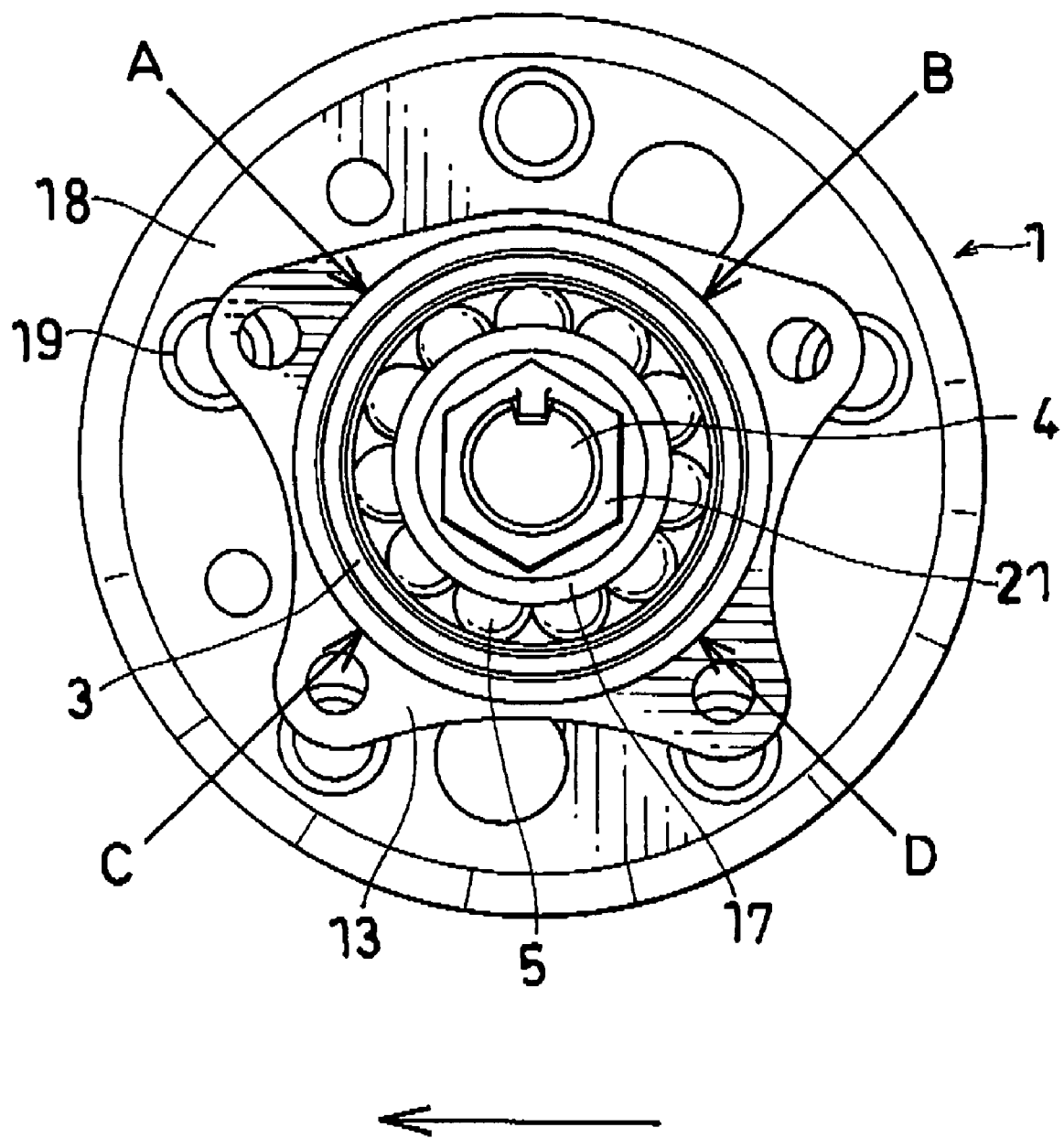
FIG. 17 is a diagram showing a hub unit with only one sensor viewed from the inside in the axial direction, for explaining the disposing position in the radial direction of the sensor of each embodiment.

In a first embodiment of a hub unit with only one magnetostrictive sensor, the magnetostrictive sensor (8) shown as to be located in the uppermost part in FIG. 1 is located near the front in the traveling direction shown as A in FIG. 17 (an arrow in the left direction shown in the figure indicates the traveling direction) in the hub unit (1) on the front wheel side, and is located near the back in the traveling direction shown as B in FIG. 17 in the hub unit (1) on the back wheel side, respectively, in one vehicle. In this way, only one magnetostrictive sensor (8) of this embodiment is provided at a position spaced apart from the uppermost part in about 45° peripheral direction.

When grounding loads (radial load and axial load) are acted on a tire, compression or tensile strain is caused in each part of the hub unit (1). The strain caused in the uppermost part or the lowermost part in the hub unit (1) is due to the left-and-right directional tire grounding load (influence of the front-and-back-directional tire grounding load is almost zero), and in the intermediate part between the uppermost part and the lowermost part of the hub unit (1) (a position spaced apart from the uppermost part or the lowermost part by 90°), the strain is due to the front-and-back directional tire grounding load (influence of the left-and-right directional tire grounding load is almost zero). Then, strain caused at the position A or B in FIG. 17 is due to both of the left-and-right directional tire grounding load and the front-and-back directional tire grounding load, which is detected by the magnetostrictive sensor (8).

For example, when the vehicle turns left, the outputs of the sensors (8) of the hub units (1) on the right side (both front and back) increase, and the outputs of the sensors (8) of the hub units (1) on the left side (both front and back) decrease. When the vehicle turns right, this becomes opposite. Further, when the vehicle is decelerated, the outputs of the sensors (8) of the hub units (1) on the front side (both left and right) increase, and the outputs of the sensors (8) of the hub units (1) on the back side (both left and right) decrease. When the vehicle is accelerated, this becomes opposite. Further, when the vehicle turns left and decelerates, the output of the sensor (8) of the hub unit (1) on the right front side becomes the maximum, and the output of the sensor (8) of the hub unit (1) on the left back side becomes the minimum. As for the sensors (8) of the hub units (1) on the right back side and the left front side, the outputs thereof increase or decrease according to the relative degree relationship between the degree of turn and the degree of deceleration.

Accordingly, from the output of each sensor (8), the synthesized grounding load applied to each tire is obtained. Further, from the difference between the total output of the front and back sensors on the left wheel side and the total output of the front and back sensors on the right wheel side, the amount of load shift at the time of turning is obtained, and from the difference between the total output of the left and right sensors on the front wheel side and the total output of the left and right sensors on the rear wheel side, the amount of load shift at the time of braking is obtained. Thereby, it is possible to control the vehicle by using the tire grounding load.

In a second embodiment of the hub unit with only one magnetostrictive sensor, the magnetostrictive sensor (9) shown as being located in the uppermost part in FIG. 2 is positioned near the front in the traveling direction shown by A in FIG. 17 in the hub unit (1) on the front wheel side, and is positioned near the back in the traveling direction shown by B in FIG. 17 in the hub unit (1) on the rear wheel side, respectively, in one vehicle. In this way, the magnetostrictive sensor (9) of this embodiment is provided only one at a position spaced apart at about 45° in a peripheral direction from the uppermost part.

Even in the second embodiment, processing similar to that of the first embodiment is possible with respect to the output of the magnetostrictive sensor (9). From the output of each sensor (9), the synthesized grounding load placed on each tire is obtained. Further, the amount of load shift at the time of turning can be obtained from the difference between the total output of the front and back sensors on the left wheel side and the total output of the front and back sensors on the right wheel side, and the amount of load shift at the time of braking can be obtained from the difference between the total output of the left and right sensors on the front wheel side and the total output of the left and right sensors on the rear wheel side. Thereby, it is possible to control the vehicle by using the tire grounding load.

In a third embodiment of the hub unit with only one magnetostrictive sensor, the magnetostrictive sensor (10) shown as being located at the lowermost part in FIG. 8 is positioned near the front in the traveling direction shown by C in FIG. 17 in the hub unit (1) on the front wheel side, and is positioned near the back in the traveling direction shown by D in FIG. 17 in the hub unit (1) on the rear wheel side, respectively, in one vehicle. In this way, the magnetostrictive sensor (10) of this embodiment is provided only one at a position spaced apart at about 45° in a peripheral direction from the lowermost part.

Even in this embodiment, processing similar to that of the first embodiment is possible with respect to the output of the magnetostrictive sensor (10). From the output of each sensor (10), the synthesized grounding load placed on each tire is obtained. Further, the amount of load shift at the time of turning can be obtained from the difference between the total output of the front and back sensors on the left wheel side and the total output of the front and back sensors on the right wheel side, and the amount of load shift at the time of braking can be obtained from the difference between the total output of the left and right sensors on the front wheel side and the total output of the left and right sensors on the rear wheel side. Thereby, it is possible to control the vehicle by using the tire grounding load.

In a first embodiment of the hub unit with only one displacement sensor, the displacement sensor (11) shown as being located in the uppermost part in FIG. 10 is provided at one position among the positions A, B, C and D in FIG. 17.

In a second embodiment of the hub unit with only one displacement sensor, the magnetostrictive sensor (10) shown as being located in the lowermost part in FIG. 8 is replaced with a displacement sensor which is provided at one position among the positions A, B, C and D in FIG. 17.

In a third embodiment of the hub unit with only one displacement sensor, the displacement sensor (11) shown as being located in the lowermost part in FIG. 12 is provided at one position among the positions A, B, C and D in FIG. 17.

In each embodiment of the hub unit with only one displacement sensor, processing same as that of each embodiment of the hub unit with only one magnetostrictive sensor is possible with respect to the output of the displacement sensor (11). That is, from the output of each sensor (11), the synthesized grounding load placed on each tire is obtained. Further, the amount of load shift at the time of turning is obtained from the difference between the total output of the front and back sensors on the left wheel side and the total output of the front and back sensors of the right wheel side, and the amount of load shift at the time of braking is obtained from the difference between the total output of the left and right sensors on the front wheel side and the total output of the left and right sensors of the rear wheel side. Thereby, it is possible to control the vehicle by using the tire grounding load.

Figure 18:
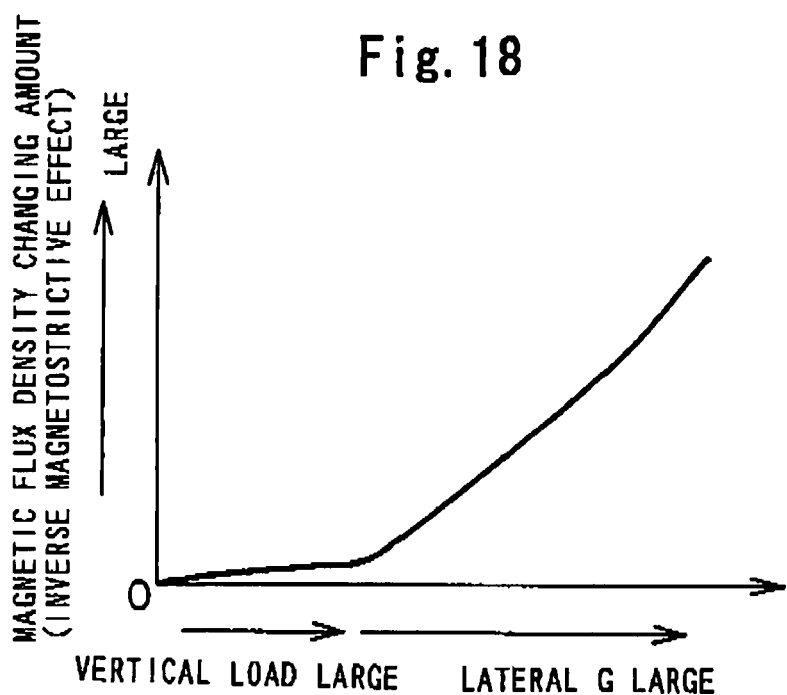
FIG. 18 is a graph showing the relationship between the output of a magnetostrictive sensor and the up-and-down directional tire grounding load and the left-and-right directional tire grounding load in the first to fourth embodiments of the first aspect of the present invention.

Note that in the magnetostrictive sensors (8) and (9) disposed at A in FIG. 16, that is, in the magnetostrictive sensors (8) and (9) for detecting the left-and-right directional tire grounding load which detect tensile strain in the uppermost part of the inner ring (17), the output value varies depending not only on the fluctuation of the left-and-right directional tire grounding load (lateral G) but also on the up-and-down directional tire grounding load (vertical load). According to the magnetostrictive sensors (8) and (9), as shown in FIG. 18, as the vertical load increases (upward force applied to the hub unit from the ground increases), the amount of variation of the magnetic flux density (inverse magnetostrictive effect) increases, so that the output value becomes larger. Further, even in a case where the lateral G increases (inward force applied from the ground to the hub unit positioned outside at cornering increases), the output value becomes larger. It is understood from the same figure that the amount of variation of the magnetic flux density is in an almost linear relationship with the left-and-right directional tire grounding load (lateral G) and the up-and-down directional tire grounding load (vertical load), and the amount of variation of the magnetostrictive density caused by an increase or decrease in the left-and-right directional tire grounding load is larger than the amount of variation of the magnetostrictive density caused by an increase or decrease in the up-and-down directional tire grounding load.

Figure 19:
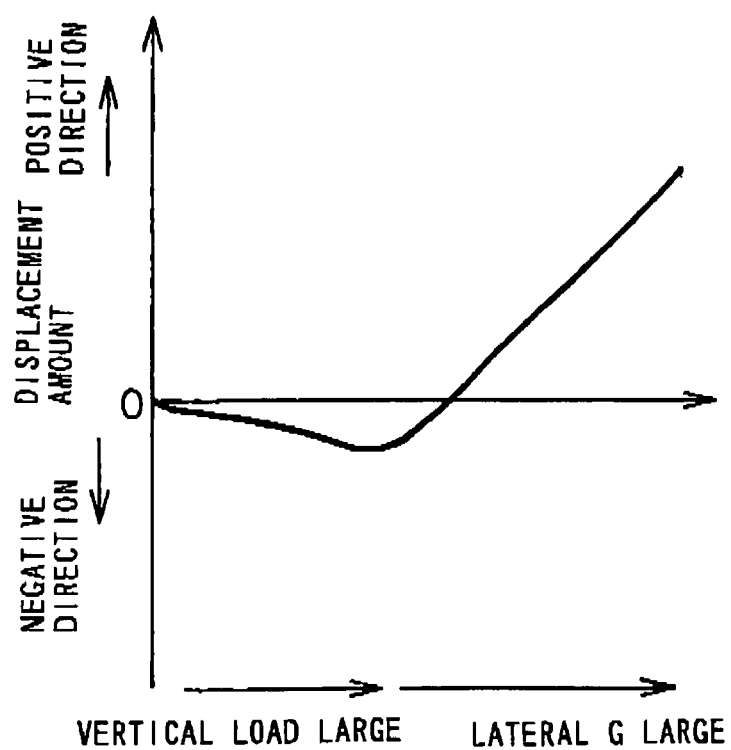
FIG. 19 is a graph showing the relationship between the output of a displacement sensor and the up-and-down directional tire grounding load and the left-and-right directional tire grounding load in the first embodiment of the second aspect of the present invention.

Further, in a case where the plumb line (C) running through the center between the two rows of balls (5) of the hub unit (1) is offset outside in the axial direction from the plumb line running through the center (0) of the tire, according to the displacement sensor (11) disposed at the position A in FIG. 16 as shown in FIG. 10, the displacement amount detected by the displacement sensor (11) decreases almost linearly from zero so as to output negative values as the up-and-down directional tire grounding load (vertical load) in an up and down direction increases from zero as shown in FIG. 19. In this state, when the left-and-right directional tire grounding load (lateral G) is applied, the value moves in a positive direction, and as the lateral G increases, the value increases almost linearly to zero, and after the value being zero, large positive values are outputted. This is because when the tire grounding point (0) is offset with respect to the center between the two rows of balls (5) of the hub unit (1), the direction of the moment load reverses depending on whether the left-and-right directional tire grounding load exists or not. By using this, the existence of the left-and-right directional tire grounding load can be detected.

Moreover, in the embodiment described above, the hub unit with a sensor according to the first aspect of the present invention uses a magnetostrictive sensor and the hub unit with a sensor according to the second aspect of the present invention uses a displacement sensor, but the magnetostrictive sensor and the displacement sensor may be used by being combined of course.

In the magnetostrictive sensors (8), (9), (38) and (39) disposed at A in FIG. 16 of the first embodiment to the fourth embodiment of the hub unit with a sensor according to the first aspect of the present invention, that is, in the magnetostrictive sensors (8), (9), (38) and (39) for detecting left-and-right directional tire grounding load which detect tensile strain in the uppermost part of the inner rings (17) and (47), the output varies when the up-and-down directional tire grounding load (vertical load) changes, or when the left-and-right directional tire grounding load (lateral G) changes, or when the both loads change at the same time, as described with reference to FIG. 18. Accordingly, it is preferable to separate the up-and-down directional tire grounding load and the left-and-right directional tire grounding load from the viewpoint of simplifying and improving the accuracy of the calculation of the sensor processor. Hereinafter, an embodiment of a sensor arrangement capable of detecting the left-and-right directional tire grounding load easily, by utilizing a fact that the plumb line (c) running through the center between the two rows of balls (5) of the hub unit (1) is offset outside in the axial direction from the plumb line running through the center (0) of the tire, will be explained.

In this embodiment, the magnetostrictive sensors (8), (9), (38) and (39) are disposed at three positions A, B and C in FIG. 16, and further the displacement sensor (11) is disposed at the position A in FIG. 16. The disposing position of the magnetostrictive sensors (8), (9), (38) and (39) may be positions in FIG. 1 (first embodiment), FIG. 2 (second embodiment), FIG. 3 (third embodiment) or FIG. 4 (forth embodiment). That is, they may be disposed at positions where tensile strain in the uppermost part of the inner rings (17) and (47) can be detected. The disposing position of the displacement sensor (11) may be one shown in FIG. 10 (first embodiment), that is, a position where the displacement in the uppermost part of the inner ring (17) can be detected. When the magnetostrictive sensors (8) and (9) are disposed at positions shown in FIG. 1 or FIG. 2, if they interfere with the displacement sensor (11), the magnetostrictive sensors (8) and (9) should be fixed to the cover (22).

If the tire grounding point (0) is offset with respect to the center (c) between the balls (5) of the hub unit (1), the displacement amount detected by the displacement sensor (11) disposed at the position A in FIG. 16 becomes those shown in FIG. 19. Therefore, it is possible to detect whether the left-and-right directional tire grounding load (lateral G) exists or not by the displacement sensor (11), so it is possible to determine whether the detected values of the magnetostrictive sensors (8), (9), (38) and (39) are due to the up-and-down directional tire grounding load or due to the left-and-right directional tire grounding load. Thereby, it is easy to detect and process by separating the up-and-down directional tire grounding load and the left-and-right directional tire grounding load from the output values of the magnetostrictive sensors (8), (9), (38) and (39).

Note that the magnetostrictive sensors (8) and (9) disposed at the positions B and C in FIG. 16 cause strain with respect to the front-and-back directional tire grounding load, but no strain is caused due to the load from the balls (5) with respect to either the up-and-down directional tire grounding load or the left-and-right directional tire grounding load. Therefore, it is possible to detect only the front-and-back directional tire grounding load by these magnetostrictive sensors (8) and (9).

INDUSTRIAL APPLICABILITY

The hub unit with a sensor according to the present invention is so configured that the hub unit constituting the automobile and the sensor device for detecting various kinds of information of the automobile are formed integrally. By using this, it is possible to obtain the tire grounding load with high accuracy, and to contribute to an improvement in the vehicle control.

The invention claimed is:
1. A hub unit with a sensor device, comprising:
a hub unit which includes a body-side raceway member to be fixed to a vehicle body, a wheel-side raceway member, having an inner shaft with a flange for mounting a wheel and an inner ring fitted to the inner shaft, to which a wheel is to be mounted, and two rows of rolling elements disposed between the both raceway members; and
a sensor device, wherein the sensor device includes at least one magnetostrictive sensor or displacement sensor for detecting an inverse magnetostrictive effect, and
processing means for processing an output of the magnetostrictive or displacement sensor,
the at least one magnetostrictive or displacement sensor is mounted to the body-side raceway member so as to be capable of measuring either tensile strain in an uppermost part of the inner ring or compression strain in a lowermost part of the body-side raceway member, and the processing means includes a tire grounding load computing unit for obtaining a tire grounding load by respectively extracting an up-and-down directional grounding load, a left-and-right directional grounding load, and a front-and-back directional grounding load, and further includes a rotation detecting unit for obtaining a wheel rotational velocity.
2. The hub unit with a sensor device according to claim 1, wherein the tire grounding load computing unit includes a left-and-right directional tire grounding load computing unit for obtaining the left-and-right directional tire grounding load.

3. The hub unit with a sensor device according to claim 1, wherein the sensor device includes at least three of said magnetostrictive or displacement sensors, the at least three magnetostrictive or displacement sensors further comprising at least one sensor for detecting the left-and-right directional tire grounding load mounted to the body-side raceway member so as to be capable of measuring either the tensile strain in the uppermost part of the inner ring or the compression strain in the lowermost part of the body-side raceway member, and at least two sensors for detecting the front-and-back directional tire grounding load mounted opposite to each other at a front and a back of the body-side raceway member so as to be capable of measuring either tensile strain in an intermediate part between the uppermost part and the lowermost part of the inner ring or compression strain in an intermediate part between the uppermost part and the lowermost part of the body-side raceway member, wherein the left-and-right directional tire grounding load is detected from an output of the sensor for detecting the left-and-right directional tire grounding load, and the front-and-back directional tire grounding load is detected from an output of the sensors for detecting the front-and back directional tire grounding load.

4. The hub unit with a sensor device according to claim 1, wherein the sensor device is mounted at only one location on a periphery of the body-side raceway member so as to be capable of measuring either the tensile strain of the inner ring or the compression strain of the body-side raceway member, and the mounting location is spaced apart at a predetermined angle from the uppermost part or the lowermost part.

5. The hub unit with a sensor device according to claim 4, wherein the hub unit with a sensor device having the sensor device for measuring the tensile strain of the inner ring is disposed at each of the front, back, left and right of a vehicle, and in the hub units of a front wheel-side, the sensors are positioned near a front in a traveling direction, and in the hub units of a rear wheel-side, the sensors are positioned near a back in the traveling direction, respectively.

6. The hub unit with a sensor device according to claim 1, wherein the at least one sensor device is made to face a shoulder part end face of the inner ring which is transverse to the axis of rotation, so as to be capable of measuring tensile strain in an axial direction of the inner ring.

7. The hub unit with a sensor device according to claim 1, wherein the at least one sensor device is made to face a shoulder part outer peripheral face of the inner ring so as to be capable of measuring tensile strain in a radial direction of the inner ring.

8. The hub unit with a sensor device according to claim 1, further comprising both the magnetostrictive sensor and the displacement sensor.

9. The hub unit with a sensor device according to claim 8, wherein a tire grounding point is offset with respect to a center between rolling members of the hub unit, and the left-and-right directional tire grounding load is detected by reference to reversal of a positive and negative sense of a displacement amount detected by the displacement sensor, and wherein the value of the left-and-right directional tire grounding load is detected from said magnetostrictive sensor for detecting the left-and-right directional tire grounding load which detects the tensile strain in the uppermost part of the inner ring.

10. A hub unit with a sensor device, comprising:
a hub unit which includes a body-side raceway member to be fixed to a vehicle body, a wheel-side raceway member, and two rows of rolling elements disposed between the two raceway members for rotatably mounting the wheel-side raceway member relative to the body-side raceway member, wherein the two rows of rolling elements are mutually spaced along the axis of rotation of the wheel-side raceway member, wherein the wheel-side raceway member includes a flange for mounting a wheel positioned at one side of the two rows of rolling elements along the axis of rotation, and wherein the wheel-side raceway member further includes an inner ring having a raceway groove for one of the rows of rolling elements, the inner ring being positioned at another side of the two rows of rolling elements along the axis of rotation, which other side is opposite the one side;
a sensor device including at least one magnetostrictive sensor for detecting an inverse magnetostrictive effect, wherein the at least one magnetostrictive sensor is mounted to the body-side raceway member at a position for measuring tensile strain in an upper part of the inner ring at the another side of the two rows of rolling elements; and
processing means for processing an output of the magnetostrictive sensor,
wherein the processing means includes a tire grounding load computing unit for obtaining a tire grounding load and a rotation detecting unit for obtaining a wheel rotational velocity.

11. The hub unit with a sensor device according to claim 10, wherein the tire grounding load computing unit includes a left-and-right directional tire grounding load computing unit for obtaining a left-and-right directional tire grounding load.

12. The hub unit with a sensor device according to claim 10, wherein the sensor device includes at least three of said magnetostrictive sensors, for detecting the inverse magnetostrictive effect, the at least three magnetostrictive sensors further comprising at least two magnetostrictive sensors for detecting a front-and-back directional tire grounding load mounted opposite to each other at a front and a back of the body-side raceway member so as to be capable of measuring tensile strain in an intermediate part between the uppermost part and the lowermost part of the inner ring the left-and-right directional tire grounding load is detected from an output of the magnetostrictive sensor mounted to the body-side raceway member at a position for measuring tensile strain in the upper part of the inner ring at the another side of the two rows of rolling elements, and the front-and-back directional tire grounding load is detected from an output of the magnetostrictive sensors for detecting the front-and-back directional tire grounding load.

13. The hub unit with a sensor device according to claim 10, wherein the mounting location of the sensor device is spaced apart at a predetermined angle from the uppermost part.

14. The hub unit with a sensor device according to claim 13, wherein the hub unit is disposed at each of the front, back, left and right of a vehicle, and in the hub units of a front wheel-side, the magnetostrictive sensors are positioned near a front in a traveling direction, and in the hub units of a rear wheel-side, the magnetostrictive sensors are positioned near a back in the traveling direction, respectively.

15. The hub unit with a sensor device according to claim 10, wherein the at least one magnetostrictive sensor faces a shoulder part end face of the inner ring which is transverse to the axis of rotation, so as to be capable of measuring tensile strain in an axial direction of the inner ring.

16. The hub unit with a sensor device according to claim 10, wherein the at least one magnetostrictive sensor faces a shoulder part outer peripheral face of the inner ring so as to be capable of measuring tensile strain in a radial direction of the inner ring.

17. The hub unit with a sensor device according to claim 10, further comprising a displacement sensor for measuring displacement in the uppermost part of the inner ring.

18. The hub unit with a sensor device according to claim 17, wherein a tire grounding point is offset toward the another side with respect to a center between rolling members of the hub unit, and a left-and-right directional tire grounding load is detected by reference to reversal of a positive and negative sense of a displacement amount detected by the displacement sensor, and wherein the value of the left-and-right directional tire grounding load is detected by said at least one magnetostrictive sensor mounted to the body-side raceway member at a position for measuring tensile strain in an upper part of the inner ring at the another side of the two rows of rolling elements.

19. A hub unit with a sensor device, comprising:

a hub unit which includes a body-side raceway member to be fixed to a vehicle body, a wheel-side raceway member, and two rows of rolling elements disposed between the two raceway members for rotatably mounting the wheel-side raceway member relative to the body-side raceway member, wherein the two rows of rolling elements are mutually spaced along the axis of rotation of the wheel-side raceway member, wherein the wheel-side raceway member includes a flange for mounting a wheel positioned at one side of the two rows of rolling elements along the axis of rotation, and wherein the wheel-side raceway member further includes an inner ring having a raceway groove for one of the rows of rolling elements, the inner ring being positioned at another side of the two rows of rolling elements along the axis of rotation, which other side is opposite the one side;

a sensor device including at least one displacement sensor, wherein the at least one displacement sensor is mounted to the body-side raceway member at a position for measuring displacement in an upper part of the inner ring at the another side of the two rows of rolling elements; and processing means for processing an output of the displacement sensor, wherein the processing means includes a tire grounding load calculating unit for obtaining a tire grounding load and a rotation detecting unit for obtaining a wheel rotational velocity.

20. The hub unit with a sensor device according to claim 19, wherein the sensor device further includes at least one displacement sensor for detecting a front-and-back directional tire grounding load mounted to the body-side raceway member so as to be capable of measuring displacement in an intermediate part between the uppermost part and the lowermost part of the inner ring, wherein the left-and-right directional tire grounding load is detected from an output of the displacement sensor mounted to the body-side raceway member at a position for measuring displacement in the upper part of the inner ring at the another side of the two rows of rolling elements, and the front-and-back directional tire grounding load is detected from an output of the displacement sensor for detecting the front-and-back tire grounding load.

21. The hub unit with a sensor device according to claim 19, wherein the displacement sensor is mounted at a mounting location spaced apart at a predetermined angle from the uppermost part.

22. The hub unit with a sensor device according to claim 19, wherein the at least one displacement sensor is made to face a shoulder part end face of the inner ring which is transverse to the axis of rotation, so as to be capable of measuring displacement in a radial direction of the inner ring.

23. The hub unit with a sensor device according to claim 22, wherein a tire grounding part is offset toward the other side with respect to a center between rolling members of the hub unit, and a left-and-right directional tire grounding load is detected by reference to reversal of a positive and negative sense of a displacement amount detected by the displacement sensor.

* * * * *